US011157706B2

(12) United States Patent
Ayers et al.

(10) Patent No.: US 11,157,706 B2
(45) Date of Patent: Oct. 26, 2021

(54) OMNICHANNEL DATA COMMUNICATIONS SYSTEM USING ARTIFICIAL INTELLIGENCE (AI) BASED MACHINE LEARNING AND PREDICTIVE ANALYSIS

(71) Applicant: ContactEngine Limited, Hertford (GB)

(72) Inventors: Andrew Mark Ayers, Northampton (GB); Giles Bryan, McLean, VA (US); Mark Kingsley Smith, Bedford (GB)

(73) Assignee: CONTACTENGINE LIMITED, Hertford (GB)

( * ) Notice: Subject to any disclaimer, the term of this patent is extended or adjusted under 35 U.S.C. 154(b) by 184 days.

(21) Appl. No.: 16/581,124

(22) Filed: Sep. 24, 2019

(65) Prior Publication Data

US 2020/0293621 A1 Sep. 17, 2020

Related U.S. Application Data

(63) Continuation of application No. 16/355,375, filed on Mar. 15, 2019, now Pat. No. 11,017,176.

(51) Int. Cl.
*G06F 40/30* (2020.01)
*G06N 20/00* (2019.01)
*H04L 12/58* (2006.01)
*G06N 3/04* (2006.01)
*G06F 40/205* (2020.01)
*G06F 40/263* (2020.01)

(52) U.S. Cl.
CPC ............ *G06F 40/30* (2020.01); *G06F 40/205* (2020.01); *G06F 40/263* (2020.01); *G06N 3/04* (2013.01); *G06N 20/00* (2019.01); *H04L 51/02* (2013.01)

(58) Field of Classification Search
CPC ..... G10L 15/1815; G10L 15/22; G06F 40/30; G06F 40/205; G06F 40/263; G06N 20/00; G06N 3/04; H04L 51/02
USPC ........ 704/9, 257, 259, 202, 265, 270.1, 270, 704/275, 231, 232; 706/47, 55, 59; 707/741, 771, 748
See application file for complete search history.

(56) References Cited

U.S. PATENT DOCUMENTS

| | | | |
|---|---|---|---|
| 9,922,642 B2* | 3/2018 | Pitschel | G10L 15/063 |
| 10,140,820 B1* | 11/2018 | Zalewski | G07G 1/0072 |
| 10,573,134 B1* | 2/2020 | Zalewski | G06Q 30/0633 |
| 2004/0117189 A1* | 6/2004 | Bennett | G09B 5/04 |
| | | | 704/270.1 |

(Continued)

*Primary Examiner* — Vijay B Chawan
(74) *Attorney, Agent, or Firm* — Haynes and Boone, LLP

(57) ABSTRACT

A system for determining context and intent in a conversation using machine learning (ML) based artificial intelligence (AI) in omnichannel data communications is disclosed. The system may comprise a data store to store and manage data within a network, a server to facilitate operations using information from the one or more data stores, and a ML-based AI subsystem to communicate with the server and the data store in the network. The ML-based AI subsystem may comprise a data access interface to receive data associated with a conversation with a user via a communication channel. The ML-based AI subsystem may comprise a processor to provide a proactive, adaptive, and intelligent conversation by applying hierarchical multi-intent data labeling framework, training at least one model with training data, and generating and deploying a production-ready model based on the trained and retained at least one model.

17 Claims, 14 Drawing Sheets

(56) References Cited

U.S. PATENT DOCUMENTS

| | | | |
|---|---|---|---|
| 2012/0191716 A1* | 7/2012 | Omoigui | H01L 27/14647 707/740 |
| 2014/0297268 A1* | 10/2014 | Govrin | G06N 5/04 704/9 |
| 2015/0006437 A1* | 1/2015 | Byron | G06F 40/55 706/11 |
| 2017/0068550 A1* | 3/2017 | Zeitlin | G06F 16/90332 |
| 2017/0091312 A1* | 3/2017 | Ajmera | G06F 16/3329 |
| 2018/0075335 A1* | 3/2018 | Braz | G06F 16/24522 |
| 2018/0097940 A1* | 4/2018 | Beilis | H04M 3/5166 |
| 2018/0376002 A1* | 12/2018 | Abraham | H04M 3/5166 |
| 2019/0042988 A1* | 2/2019 | Brown | G06F 16/9535 |
| 2019/0043483 A1* | 2/2019 | Chakraborty | G06N 3/006 |
| 2019/0121850 A1* | 4/2019 | Banerjee | H04L 67/36 |
| 2019/0124020 A1* | 4/2019 | Bobbarjung | G06Q 20/123 |
| 2019/0272323 A1* | 9/2019 | Galitsky | G06F 40/30 |
| 2020/0153964 A1* | 5/2020 | Copeland | G06Q 30/016 |

\* cited by examiner

OMNICHANNEL DATA COMMUNICATIONS SYSTEM USING ARTIFICIAL INTELLIGENCE (AI) BASED MACHINE LEARNING AND PREDICTIVE ANALYSIS

PRIORITY

This application is a Continuation of commonly assigned and U.S. patent application Ser. No. 16/355,375, filed Mar. 15, 2019, the disclosures of which are hereby incorporated by reference in their entireties.

TECHNICAL FIELD

This patent application relates generally to data communications, and more specifically, to systems and methods for omnichannel data communications using artificial intelligence (AI) based machine learning and predictive analysis.

BACKGROUND

Centralized scheduling services are useful for coordinating meetings and tasks, as well as scheduling appointments. Recent advances in mobile telecommunications are changing the way people communicate with one another and the way people buy goods and services. In the service industry, for example, a customer journey may involve numerous interactions a company, like a media company, has with its customers or subscribers. For instance, when a customer is interested in purchasing or troubleshooting a particular issue related to a service, this particular transaction is merely the tip of the iceberg in what is essentially a "journey" created by all the moments leading up to and following that that transaction. Ultimately, the media company can offer great products or services, build a stellar website, provide speedy delivery, and even have a dedicated customer service team, but any weak link in this very long chain could send a current or potential customer elsewhere.

Although traditional models have sought to enhance the customer journey in a variety of ways, a technical problem with most traditional online customer conversation systems is that they are typically solely based on static one-size-fits-all platforms. However, the needs of a media company and its subscribers is different than with that of a merchant and its customers. Furthermore, some traditional approaches focus on collecting large amounts of data while providing only limited analytics. In addition, current conventional systems generally lack a proactive, adaptive, or intelligent approach to customer interaction and often frustrate both customer and organization alike. Such systems inexorably fail to offer any meaningful way for an organization to "think" more like a customer and leverage insight to more seamlessly map out the various touchpoints of a customer journey to maximize customer experience.

As a result, a more robust approach and holistic solution that better identifies customer touchpoints and improves customer journey and experience using artificial intelligence (AI) based machine learning and predictive analysis. may be imperative to overcome the shortcomings of conventional systems and methods.

BRIEF DESCRIPTION OF DRAWINGS

Features of the present disclosure are illustrated by way of example and not limited in the following Figure(s), in which like numerals indicate like elements, in which.

DETAILED DESCRIPTION

Figure 1:
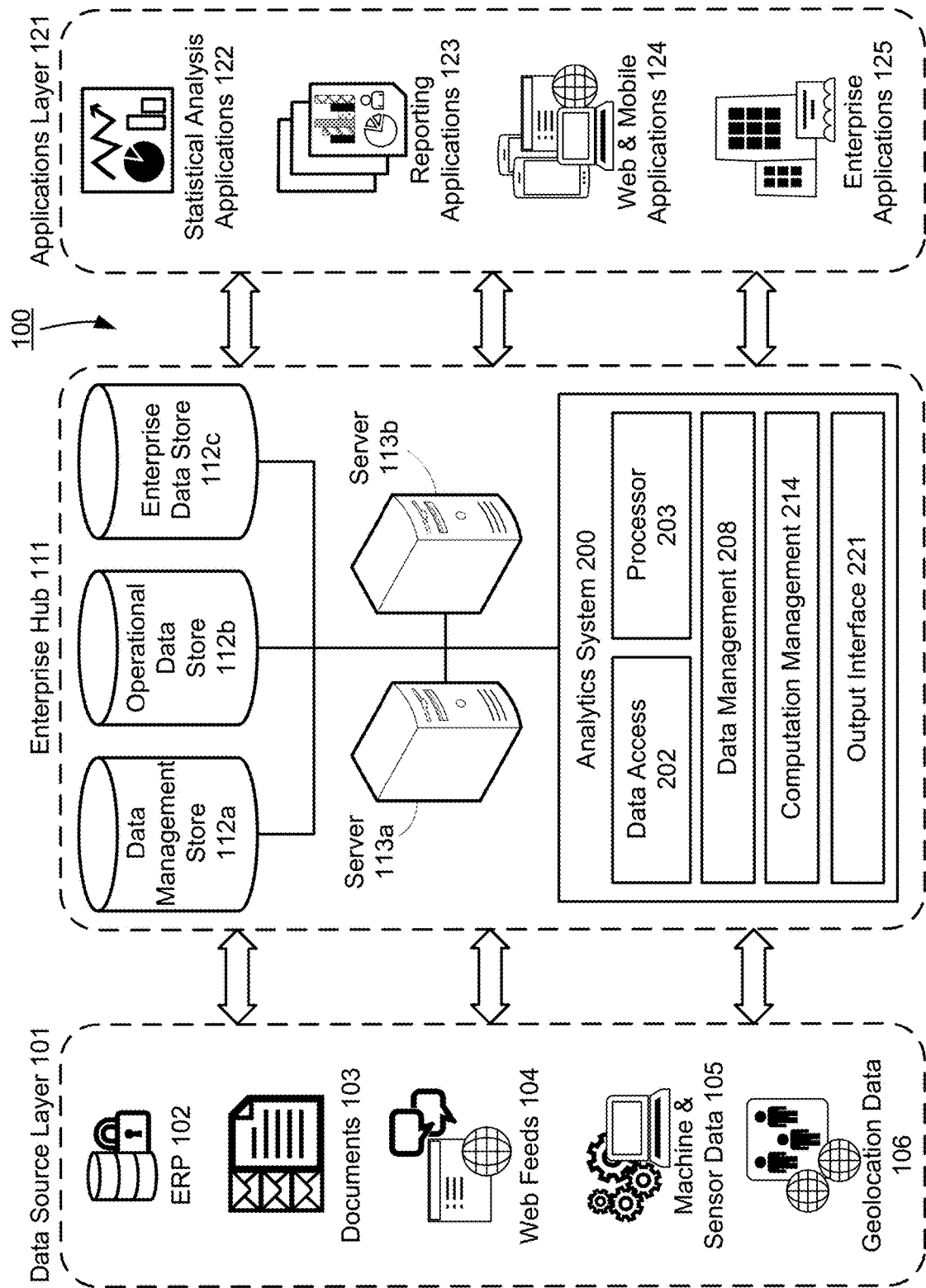
FIG. 1 illustrates an architecture for an artificial intelligence (AI) based omnichannel communication system, according to an example.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

As described above, a customer journey may involve numerous interactions a company has with its customers. In order to optimize a customer journey, it may be important for a merchant to recognize and take advantage of all available customer touchpoints and channels. As described herein, a touchpoint may refer to any time, place, or way a potential customer or returning customer interacts with a business before, during, or after the customer purchases a good or service. A channel, as described herein, may describe in more detail a medium of interaction between a customer and a business, such as through a mobile application or a customer service representative at a call center.

According to examples described herein, a proactive, adaptive, and intelligent approach may be provided to help organizational entities provide omnichannel communications that provide a more intuitive, natural, and pleasant online experience for customers. Furthermore, a more robust and holistic approach for artificial intelligence (AI) based omnichannel communications using machine learning and predictive analysis may be imperative to overcome the shortcomings of conventional systems and methods.

As described herein, an artificial intelligence (AI) based omnichannel communication system using machine learning and predictive analysis may be provided. In an example, the artificial intelligence (AI) based omnichannel communication system may reduce complexity of customer conversation platforms. By providing a micro-personalized conversation to each individual customer using AI-based techniques, an omnichannel dialogue may be established in a way that provides customers with enhanced customer experience, improved data security, and a more responsive and centralized way to meet the needs or requests of customers.

More than just providing an immediate or pertinent response to customer inquiries, embodiments described herein may provide a smooth, intuitive, and human-like conversation, coupled with support delivery without having to switch customers to different departments or do a "channel flip." In other words, embodiments described herein may provide a one-stop-shop where customer satisfaction is preserved and the conversation experience leads to efficient business fulfilment. Systems and methods described herein may also recognize when actual human touch or interaction is needed, and may manage or escalate such processes. These may be provided in real-time or near real-time and may handle a multitude of simultaneous AI-based conversations with a variety of organizations and customers.

It should be appreciated that the artificial intelligence (AI) based omnichannel communication system may also treat users differently based on an assigned risk score or parameter. For example, the artificial intelligence (AI) based omnichannel communication system may employ various techniques to keep a user engaged with the application if the risk score is high. Keeping the user engaged with the application may allow administrators or other personnel, usually via additional research, more information about the user while he or she is still engaged with the application. This allows a more customized approach to user-verification based on complexity of customer behavior as well as available resources on various users in real-time or near real-time.

Legal boundaries may also be administered as part of the online interaction. For example, users may be issued legal acknowledgments or end user agreements in a seamless and natural way. These may serve as an agreement by a user that he or she is starting an online conversation, whose contents or subject of discussion may be used for monitoring and/or training purposes. Any data included may then be part of the legal boundaries of the conversation.

It should be appreciated that at any point, the digital application conversation may be paused and/or resumed to allow for intelligence or other processes to start/complete. The systems and methods described herein may also support ability to schedule human intervention to ask questions and to gather intelligence from a potentially nefarious user. It should also be appreciated that the user or application, at each point along the digital application conversation, may be consenting to the use of the information and at any time can choose to withdraw from the conversation.

The artificial intelligence (AI) based omnichannel communication system described herein may enable various organizations or brands to proactively engage customers in AI-driven conversations to fulfil business objectives. In its core, the artificial intelligence (AI) based omnichannel communication system may be able to handle multiple streams of live data allowing it to "see" exactly what is happening within the critical processes that an organization relies upon for its success. By connecting sensors to these live streams, the artificial intelligence (AI) based omnichannel communication system may be able to look for changes in state or patterns within the data that activate particular business objectives or goals. These data triggers may be identified using a combination of data analysis, artificial intelligence, and machine learning techniques. By way of an example, the booking of an appointment to have a service or device repaired may activate an objective to see that appointment completed successfully, or observing a pattern in the data that suggests the likelihood of the customer moving to a competitor may activate an objective to save that customer and ensure the continuation of the business relationship. The artificial intelligence (AI) based omnichannel communication system may also detect changes in the data and acquiesce that an existing objective is no longer valid or must be modified to guarantee success. Reprioritization of appointments may also be more easily handled in such a way that ensures excellent service to help with customer retention.

At the end, the artificial intelligence (AI) based omnichannel communication system described herein may therefore allow an organizational entity (e.g., commercial, financial, government, etc.) to engage with users in various ways to optimize customer engagement. The artificial intelligence (AI) based omnichannel communication system may also provide customized user interfaces to make user interactions more pleasant and meaningful, less error prone, and more intelligent, all of which may help facilitate user inquiries or request for goods or services by the organizational entity.

FIG. 1 illustrates an artificial intelligence (AI) based omnichannel communication system 100, according to an example. The artificial intelligence (AI) based omnichannel communication system 100 may be used to monitor and analyze data. In particular, the artificial intelligence (AI) based omnichannel communication system 100 may be used provide a communication or conversation platform between an organizational entity and a user (e.g., customer). The organizational entity may be a financial entity, a commercial entity, a government entity, or other entity. The artificial intelligence (AI) based omnichannel communication system 100 may also store information or be able to receive information from other sources associated with personal data or information, some of which may be sensitive data or information. For example, the artificial intelligence (AI) based omnichannel communication system 100 may use machine learning and predictive analytics to help protect communication of data and improve user experience. The artificial intelligence (AI) based omnichannel communication system 100 may further include any number of AI-based learning systems (e.g., a clustering system, knowledge graphs, etc.) to provide human-like interactions with users or customers.

The artificial intelligence (AI) based omnichannel communication system 100 may operate in a network or an enterprise environment where data is exchanged, and where products or services are being offered to customers. More specifically, the artificial intelligence (AI) based omnichannel communication system 100 may provide real-time or near real-time monitoring and analysis of data exchange and data storage, as well as an artificial intelligence system that uses analytics and predictive modeling. The enterprise environment of the artificial intelligence (AI) based omnichannel communication system 100 may include a data source layer 101, an enterprise hub 111, and an applications layer 121. The data source layer 101 may include systems, subsystems, applications, and/or interfaces to collect information from enterprise resource planning (ERP) systems and applications 102, documents 103, web feeds 104, machine and sensor data 105 (hereinafter "sensor data"), and geolocation data 106, all of which may be distinct or integrated with the artificial intelligence (AI) based omnichannel communication system 100. The data source layer 101 may include other data or information sources as well. It should be appreciated that each of these data sources may further include its own data feed, storage, system, application, or other source for collecting and sending data and information, including third party or indirect sources.

The ERP 102 may include one or more application servers that host various ERP applications. These may include, for example, a customer relationship management (CRM) platform, system, or application. The ERP 102 may collect, store, manage, and interpret data associated with various enterprise functions or activities. The ERP 102 may provide an integrated and continuously updated view of core business processes using common databases maintained by a database management system. The ERP 102 may track enterprise resources (e.g., cash, raw materials, production capacity, etc.) as well as other information, such as corporate or business transactions (e.g., orders, purchase orders, payroll, ticketing, etc.). Furthermore, the applications that make up the ERP 102 may share data across various departments (e.g., manufacturing, purchasing, sales, accounting, etc.) that provide the data. The ERP 102 may facilitate information flow between many enterprise functions and may manage communications with stakeholders or other outside parties. As a result, the ERP 102 may contain large quantities of information and data associated with a company, its employees, and various resources.

The documents 103 may provide another source of data. Data received at the documents 103 may include files, emails, faxes, scans, or other documents that are transmitted, received, and stored in an enterprise environment.

The web feeds 104 may be yet another source of data. Data received at the web feeds 104 may include data from various web sources, such as websites, social media, syndication, or aggregators. Websites may include uniform resource locator (URL) or other website identifier. This may also include RSS feeds, which allow users to access updates to online content. Data from social media may also include any type of internet-based application built upon creation and exchange of user-generated content, which may include information collected from social networking, microblogging, photosharing, news aggregation, video sharing, livecasting, virtual worlds, social gaming, social search, instant messaging, or other interactive media sources. Furthermore, techniques to gather or collect data from websites or other Internet sources may be provided. These techniques may involve fetching (e.g., downloading content or data from a web page) and extraction (e.g., parsing, searching, reformatting, copying, compiling, monitoring, etc.) of data. Other similar techniques may include document object model (DOM) parsing, computer vision, and natural language processing (NLP) to simulate human-like browsing to enable gathering web page content for offline parsing.

The machine and sensor data 105 may be another source of data and information in an enterprise environment. For example, in an enterprise network, there may be physical devices, vehicles, appliances, and other enterprise systems that are equipped with electronics, software, and sensors, where most, if not all, of these items are within a network and share some measure of connectivity which enable these and other pieces of equipment to connect, communicate, and exchange data. This may allow various systems, objects, and items in an enterprise environment to be detected, sensed, or remotely controlled over one or more networks, creating a vast array of enterprise functionalities. These may include abilities to provide data analytics on equipment, assessment of equipment health or performance, improved efficiency, increased accuracy or function, economic benefit, reduction of human error, etc. By creating a "smarter" environment and leveraging interactivity between various pieces of equipment in a network, the machine and sensor data 105 may provide significant amounts of information and data that can be collected. Together with other technologies and systems described herein, the machine and sensor data 105 may help enable the artificial intelligence (AI) based omnichannel communication system 100 provide a more efficient way to balance user experience with data security and a more natural, human-like online conversation platform.

The geolocation data 106 may include information or data associated with identification or estimation of real-world geographic location of an object, such as a radar source, mobile device, or web-based computer or processing device. Geolocation data 106 may provide specific geographic coordinates or data that may be used for monitoring location, distinct or together with, other various positioning systems or applications. For example, the geolocation data 106 may include internet protocol (IP) address, media access control (MAC) address, radio-frequency identification (RFID), global positioning system (GPS), embedded software number, WiFi positioning system (WPS), device fingerprinting, canvas fingerprinting, etc. The geolocation data 106 may include other self-disclosing or self-identifying information, including but not limited to country, region county, city, postal/zip code, latitude, longitude, time zone, domain name, connection speed, internet service provider (ISP), language, proxies, or other information that can be used to piece together and trace location. This and other data in the data source layer 101 may be collected, monitored, analyzed, and/or incorporated with artificial intelligence (AI) based omnichannel communication system 100 using machine learning and predictive analytics.

The enterprise hub 111 may collect, manage, process, and analyze information and data from the data source layer 101 and the applications layer 121. The enterprise hub 111 may be within general control of an enterprise, such as an organizational entity conducting operations, business, or other related activities. The enterprise hub 111 may collect, manage, process, and analyze information and data from the data source layer 101 and the applications layer 121. In order to do this, the enterprise hub 111 may include one or more data stores, one or more servers, and other elements to process data for its organizational purposes. For example, the enterprise hub 111 may include a data management store 112a, an operational data store 112b, and an enterprise data store 112c. The data management store 112a may store information and data associated with data governance, assets, analysis, modeling, maintenance, administration, access, erasure, privacy, security, cleansing, quality, integration, business intelligence, mining, movement, warehousing, records, identify, theft, registry, publishing, metadata, planning, and other disciplines related to managing data as a value resource.

The operational data store 112b may store information and data associated with operational reporting, controls, and decision-making. The operational data store 112b may be designed to integrate data from multiple sources for additional operations on that data, for example, in reporting, controls, and operational decision support. Integration of data at the operational data store 112b may involve cleaning, resolving redundancy, checking against business rules, and other data integration techniques, such as data virtualization, federation, and extract, transform, and load (ETL). The operational data store 112b may also be a source of data for an enterprise data store 112c, which may be used for tactical and strategic decision support.

The enterprise data store 112c may store information and data associated with reporting and data analysis, and may be instrumental to various business intelligence functions. For example, the enterprise data store 112c may be one or more repositories of integrated data (e.g., from the operational data store 112b) and used to store current and historical data and to create analytical report(s) for advanced enterprise knowledge. Data passed through the enterprise data store 112c may also involve cleansing to ensure data quality and usage. ETL may also be used, as well as other techniques, involving staging, data integration, and access features. Ultimately, data in the enterprise data store 112c may be transformed and catalogued so that it may be used for data mining, analytics, and other business intelligence purposes, such as marketing, decision support, etc. Other data stores may also be provided in the enterprise hub 111, such as data marts, data vaults, data warehouses, data repositories, etc.

It should be appreciated that the data stores described herein may include volatile and/or nonvolatile data storage that may store data and software or firmware including machine-readable instructions. The software or firmware may include subroutines or applications that perform the functions of the system 100 and/or run one or more application that utilize data from the system 100. Other various server components or configurations may also be provided.

The enterprise hub 111 may further include a variety of servers 113a and 113b that facilitate, coordinate, and manage information and data. For example, the servers 113a and 113b, as well as others described herein, may include any number or combination of the following servers: exchange servers, content management server, application servers, database servers, directory servers, web servers, security servers, enterprise servers, and analytics servers. Other servers to provide data security and protection may also be provided.

The enterprise hub 111 may also include an analytics system 200. The analytics system 200 may include various layers, processors, systems or subsystems. For example, the analytics system 200 may include a data access interface 202, a processor 203, a data management subsystem 208, a computation management subsystem 214, and an output interface 222. Other layers, processing components, systems or subsystems, or analytics components may also be provided. It should be appreciated that the data management subsystem 208 and computation management subsystem 214 may be other processing components integrated or distinct from processor 203 to help facilitate data processing by the analytics system 200 as described herein. Features and functionalities may be particularly helpful in data management, predictive analytics, and machine learning.

There may be many examples of hardware that may be used for any of the servers, layers, subsystems, and components of the analytics system 200 or the artificial intelligence (AI) based omnichannel communication system 100 described herein. For example, the processor 203 may be an integrated circuit, and may execute software or firmware or comprise custom processing circuits, such as an application-specific integrated circuit (ASIC) or field-programmable gate array (FPGA). The data access interface 202 and output interface 221 may be any number of hardware, network, or software interfaces that serves to facilitate communication and exchange of data between any number of or combination of equipment, protocol layers, or applications. For example, the data access interface 202 and output interface 221 may each include a network interface to communicate with other servers, devices, components or network elements via a network in the artificial intelligence (AI) based omnichannel communication system 100. More detail of the analytics system 200 is provided in FIG. 2.

The artificial intelligence (AI) based omnichannel communication system 100 may also include an applications layer 121. The applications layer 121 may include any number or combination of systems and applications that interface with users or user-interfacing tools in an enterprise or a personal environment. For example, the applications layer 121 may include statistical analysis applications 122, reporting applications 123, web and mobile applications 124, and enterprise applications 125.

The statistical analysis applications 122 may include systems or applications that specialize in statistical calculations or econometrics. These may include, but not limited to, those by Tableau®, Domo®, Salesforce®, JMP®, MATLAB®, QlikSense®, SPSS®, SAS®, Stata®, Alteryx®, Analytica®, etc. The reporting applications 123 may include systems or applications that that provide reporting, for example, in business intelligence, visualization, and other useful enterprise reporting tools. These may include, but not limited to, Dundas BI®, Domo®, Sisense®, Yellowfin®, Sharepoint®, SAP®, etc.

The web and mobile applications 124 may include Internet-based or mobile device based systems or applications of various users, namely those in an enterprise environment. The enterprise applications 125 may include systems or applications used by an enterprise that is typically business-oriented. For example, these may include online payment processing, interactive product cataloguing, billing systems, security, enterprise content management, IT service management, customer relationship management, business intelligence, project management, human resource management, manufacturing, health and safety, automation, or other similar system or application. In an example, these enterprise applications 125 may be external or remote to the enterprise hub 111.

It should be appreciated that a layer, as described herein, may include a platform and at least one application. An application may include software comprised of machine-readable instructions stored on a non-transitory computer readable medium and executable by a processor. The systems, subsystems, and layers shown in FIG. 1 or other figure may include one or more servers or computing devices. A platform may be an environment in which an application is designed to run on. For example, a platform may include hardware to execute the application, an operating system (OS), and runtime libraries. The application may be compiled to run on the platform. The runtime libraries may include low-level routines or subroutines called by the application to invoke some of behaviors, such as exception handling, memory management, etc., of the platform at runtime. A subsystem may be similar to a platform and may include software and hardware to run various software or applications.

It should be appreciated that a single server is shown for each of the servers 113a and 113b, and/or other servers within the systems, layers, and subsystems of the artificial intelligence (AI) based omnichannel communication system 100, as described herein. However, it should be appreciated that multiple servers may be used for each of these servers, and the servers may be connected via one or more networks. Also, middleware (not shown) may be included in the artificial intelligence (AI) based omnichannel communication system 100 as well. The middleware may include, for example, software hosted by one or more servers, or it may include a gateway or other related element. Such middleware may be used to enhance data processing, edge-based analytics, or other related operations. Furthermore, it should be appreciated that some of the middleware or servers may or may not be needed to achieve functionality. Other types of servers, middleware, systems, platforms, and applications not shown may also be provided at the back-end to facilitate the features and functionalities of the artificial intelligence (AI) based omnichannel communication system 100.

The artificial intelligence (AI) based omnichannel communication system 100, as described herein, may provide several benefits and advantages over conventional techniques. For example, the artificial intelligence (AI) based omnichannel communication system 100 may balance user experience with an analytics-based conversation platform. Accordingly, more human-like and natural conversations may be provided to customers via his or her desired communication channel, regardless of simultaneous conversation volumes. All the while, the artificial intelligence (AI) based omnichannel communication system 100 may know utilize AI-based techniques to "understand" any conversation and to "learn" from it so that customers are engaged appropriately. This not only enhances user experience, but minimizes misunderstanding, increase productivity, and reduces response time for customer support demands.

The artificial intelligence (AI) based omnichannel communication system 100 may also be friction driven. In other words, friction may be defined by a level of effort applied to a user or applicant during a conversation or communication process. As stated above, customer behavior is complex and gathering information may not be the same for one customer as it is for another customer. As the artificial intelligence (AI) based omnichannel communication system 100 discovers areas of friction, it may formulate ways to reduce such friction for similarly situated users or customers. Information such as location, subject matter of conversation, method of interaction, words or phrases used, etc. may be collected and analyzed to provide a better user experience and more efficient service delivery. The artificial intelligence (AI) based omnichannel communication system 100 may leverage power of analytical business intelligence and other features to provide users with infinite variations of frictions to support any type of communication or conversation.

The artificial intelligence (AI) based omnichannel communication system 100 may be platform independent. In other words, online applications associated with the artificial intelligence (AI) based omnichannel communication system 100 may be used across various platforms, such as Windows, MAC, Unix, or other operating systems. The artificial intelligence (AI) based omnichannel communication system 100 may also be hosted in the cloud, provisioned/accessed via the web, or provided locally/remotely via on-site premises, or via a variety of mobile device applications or systems.

Within the artificial intelligence (AI) based omnichannel communication system 100, there may be a large amount of data that is exchanged, and the exchanged data may sensitive or personal. Many of the conventional security systems for protecting sensitive data, as described above, are static and not dynamic. With new laws and regulations surrounding sensitive personal data in possession by organizational entities, a more robust approach to handle and process potentially sensitive personal data may be needed.

The General Data Protection Regulation (GDPR), for example, is a new regulation recently passed by the European Parliament (EP), the Counsel of the European Union (EU), and the European Commission (EC) in order to strengthen and unify data protection for individuals within the EU. The GDPR specifically addresses the export of personal data outside of the EU and aims to give control back to citizens and residents over their personal data, as well as to simplify the regulatory environment for international business. These and other new laws are having an impact to companies, organizations, and entities that are entrusted or in possession of private or personal data. In order to comply with these new laws and regulations, such as the GDPR, organizational entities may need to understand what data and information they possess, why they possess it, and the potential sensitivity of that that data. The artificial intelligence (AI) based omnichannel communication system 100, as described herein, may also therefore provide a more dynamic and scientific approach to provide monitoring, diagnostics, and analytics to using and processing such potential sensitive data in an enterprise network.

Ultimately, the artificial intelligence (AI) based omnichannel communication system 100 may provide a proactive, adaptive, and intelligent approach to help organizational entities that ensure data security, enhance efficiency, and provide a more intuitive, natural, and pleasant online experience for customers. The artificial intelligence (AI) based omnichannel communication system 100 may provide a more robust and holistic approach for artificial intelligence (AI) based omnichannel communications using machine learning and predictive analysis may be imperative to overcome the shortcomings of conventional systems and methods.

Figure 2:
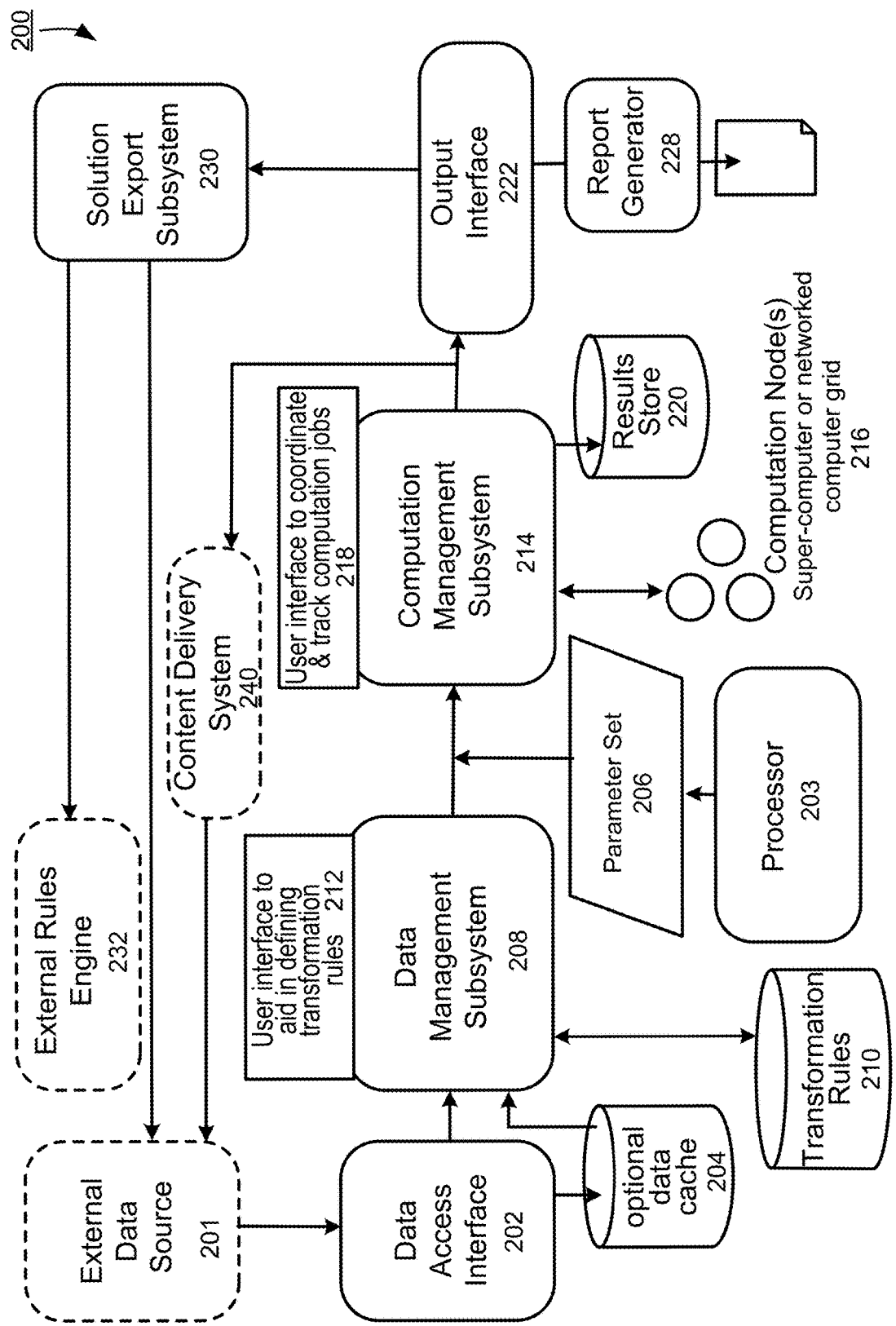
FIG. 2 illustrates an example of components in an analytics system, according to an example.

FIG. 2 illustrates an example of components in the analytics system 200, according to an example. Although the analytics system 200 shown in FIG. 2 is depicted in an integrated manner, it should be appreciated that the analytics system 200 may be implemented in a distributed manner as well (completely or partly) across multiple devices and systems (e.g., personal devices such as smartphones, laptops, or server computers), or some (or all) components may be installed on the same device. Components on separate devices may use any suitable communications technique to transmit data (represented by the arrows) between one another. For example, in an implementation, the analytics system 200 may a proactive, adaptive, and intelligent approach to communication and customer conversations to help organizational entities that ensure data security, enhance efficiency, and provide a more intuitive, natural, and pleasant online experience. In an example, the analytics system 200 may be an integrated system as part of the enterprise hub 111 shown in FIG. 1.

In the example of FIG. 2, data may be accessed from an external data source 201 by a data access interface 202. The external data source 201 may be any data source from the data source layer 101, enterprise hub 111, and applications layer 121 of the artificial intelligence (AI) based omnichannel communication system 100 of FIG. 1, as well as other data sources not depicted. The data access interface 202 may optionally store some or all (or none) of the data in an optional data cache 204, which may be local or remote. The imported data may then be passed to a data management subsystem 208 for processing prior to performing analytics. For example, the data management subsystem 208 may organize the data by grouping, ordering, transforming, or cleaning the data in such a way that facilitates input of the data into analytics processing. The data management subsystem 208 may use one or more transformation rules that specify one or more rules to apply to the data for processing. In an example, the transformation rules may be accessed from storage (e.g., from data store 210). Additionally or alternatively, the transformation rules may be input by a user. For example, the data management subsystem 208 may provide a user interface 212 to a user that enables the user to specify one or more transformation rules. The data management subsystem 208 may also implement data management without rules (e.g., non-rule-based) and rely on other data management schemes.

The data management subsystem 208 may identify different types of variables that are specified by the user, and separate the variables according to the identified type. Some types of variables may be used as inputs to the analytics process, while other types of variables may be used evaluation criteria to evaluate the resulting analytics solutions. As such, the system may enable not only automated processing of data, but also automated evaluation of the resulting analytics solutions.

In an example involving clustering, the analytics system 200 may separate variables in the data across three distinct types: Target Drivers, Cluster Candidates, and Profile Variables. Target Drivers may be factors that are for driving the success of a business, such as revenue, profitability, potential value of a customer, costs, etc. In some cases, there may be no more than two or three target drivers. Cluster Candidates may be attributes that are readily available that may be used to partition the overall population. These may describe the population and may be significantly different from the business drivers. Profile Variables may be other factors that are not assigned as cluster candidates or target drivers. Profile variables may not be immediately actionable (the data may not be easily accessible or may be found only after a period of lime) or they may be too much of a restatement of the business drivers.

The variables determined by the data management subsystem 208 and a parameter set 206 generated by the processor 203 may be provided to the computation management subsystem 214. The computation management subsystem 214 may send the processed data including the parameter set 206 and one or more chosen clustering algorithms to one or more computational nodes 216 to perform clustering operations. The clustering operations may identify several (e.g., thousands or millions) different cluster solutions, each including a plurality of clusters of the data.

The computation management subsystem 214 may evaluate generated cluster solutions based on user-specified criteria, and iterate through multiple sets of cluster solutions to identify cluster solutions that satisfy the criteria. The computation management subsystem 214 may identify also apply one or more generalized heuristic supervised learning algorithms to the computation process to improve the efficiency of the solution search, based on the cluster solutions generated by the computational nodes 216. The supervised learning algorithms may utilize target driver variables specified by the user to facilitate searching for particular cluster solution(s), among the potentially many cluster solutions generated by the computation nodes 216, that are meaningful to the user. The computation management subsystem 214 may also provide a user interface 218 that shows the user the progress of the clustering and shows cluster solutions.

The computation management subsystem 214 may also provide a user interface 212 that shows the user the progress of the clustering and shows cluster solutions. The user interface may be an output interface 222, like that shown in FIG. 1, which may in turn include a visualization interface that may show cluster solution(s) and other information pertaining to the cluster solutions. A report generator 228 may generate report regarding the cluster solutions.

In some implementations, the visualization interface may also provide the cluster solution(s) and/or evaluation results to a solution export subsystem 230. The solution export subsystem 230 may provide feedback information to the analytics system 200 or other systems in the artificial intelligence (AI) based omnichannel communication system 100. For example, the solution export subsystem 230 may provide feedback information to an external rules engine 232 (or other feedback component), which may, for instance, use the feedback information to adapt one or more transformation rules. Additionally or alternatively, the solution export subsystem 230 may feedback information to the external data source 201, for instance, to adjust one or more variables or attributes in the data. In this way, the analytics system may be fine-tuned to provide improved and more accurate calculations and computations.

For example, the solution export subsystem 230 may be configured to export information regarding a cluster solution to different types of external databases and external systems, and facilitate the implementation of the cluster solution by the external systems. In some implementations, the solution export subsystem 230 may be configured to export one or more rules or algorithms for clustering data, based on the cluster solution that was generated. The rules or algorithms may enable external systems to apply those rules or algorithms to implement the generated cluster solution to various types of data stored on the external database. In some implementations, the system may obtain data from the external system, retune the cluster solution based on the received data (such as changing variable selection), and send information regarding a revised cluster solution to the external system. As such, in some implementations, the analytics system 200 may enable more than just an analytics tool, but also enable a feedback-based and connected enterprise system.

The output interface 222 may include a visualization interface that provides the resulting cluster solution(s) and results of the evaluation to a report generator 228, which may generate a report to be output to the user, such as a security manager or other user. The report may include various types of information regarding the evaluation of the cluster solution(s) or other calculation, and may enable a user to adjust one or more variables of the analytics system 200 to fine-tune the clustering operations.

By providing a composite technique of cluster generation and cluster evaluation, the analytics system 200 may enable the user to analyze the details and nuances of many (e.g., dozens of) solutions at the same time, rather than individually analyzing one solution at a time to see if each solution is appropriate. This may be particularly helpful in conversation analysis. The analytics system 200 may therefore enable a user to explore a large number (e.g., millions) of cluster solutions efficiently in less time than it would take a typical practitioner to evaluate fewer (e.g., a couple dozen) cluster solutions.

It should be appreciated that data exchanged in a conversation with a customer may involve processing data. In some examples, data may be multimodal. Audio or visually-oriented data (e.g., a digital image video), for example, may require additional processing. For instance, this may also include processing metadata associated with that digital image. As needed, pattern recognition may be applied during image processing to detect a particular object or pattern in the image. Different types of conventional machine learning functions may be used for pattern recognition.

In some examples, the analytics system 200, according to various examples, may build and train multiple machine learning classifiers as well. These may include convolutional neural networks (CNNs). The machine learning classifiers may perform image/textual processing to detect particular attributes of interested images/text. Such attributes may be used for image/textual matching to identify visual or textual content. It should be appreciated that "visual" or "image" data, as described herein, may also include textual data, audio data, or video data as well. In other words, "visual data processing" or "image processing," as used herein, may include, without limitation, processing and analysis of multimodal information. For example, this may include processing of textual, audio, video, or other similar data in addition to the actual visual or image data.

CNNs may include many layers to detect, parse, and understand data, e.g., intent or meaning of data. Furthermore, each layer of the CNN may have a multitude of parameters associated with it. Specific values of those parameters for a successful and accurate data classification may not be known a priori. The analytics system 200, according to various examples, may provide a method for building and training CNNs to output an accurate classification of data for purposes of creating intuitive artificial conversational entities or other conversational applications for use in the artificial intelligence (AI) based omnichannel communication system 100.

Multiple CNNs may be built and trained by a machine learning processing system. According to an example, a CNN built and trained by a machine learning processing system may include a CNN. The CNN may identify and determine one or more phrases and match against other similar phrases or characters to determine meaning, context, or intent. Together with other data sources, such as dictionaries, thesaurus, reference materials, etc., a more robust and self-learning system may be provided to better understand user queries and provide natural AI-based responses.

As discussed in more detail herein, the CNN may be able to identify particular attributes of the data which may be used for human-like conversational platform deployment. This may be particular helpful in understanding meaning of user queries and other processing and analysis. Furthermore, the CNN may operate in real-time or near real-time to facilitate accurate matching or classification objects from data. Accordingly, together with natural language processing (NLP) and/or other processing techniques, a machine learning processing system may be used to create and deploy a human-like experience during conversations with users, as well as provide a variety of other functions and services for enhance customer interaction.

In another example, the analytics system 200 may also include an external system, such as content delivery system 240, that may be controlled based on a selected cluster solution. For example, instructions may be sent to the content delivery system 240 based on attributes determined for clusters in the selected cluster solution. In an example, attributes may be identified for a cluster that are associated with customer habits and patterns, which may allow for greater marketing or product/service offerings, as well as coupons, discounts, or referrals. In an example, the content delivery system 240 may include a contact resource management system, such as provided by Salesforce.com®, Infusionsoft®, Microsoft Dynamics®, etc., which automatically targets customers. For example, data in a database that is associated with customers may be queried and for each customer customized emails or coupons are automatically sent. The content delivery system 240 may have the flexibility to send emails and coupons with a time-interval of hours, days, weeks, etc. and also has an option to trigger sending through the instructions. The external data source 201 may capture online behaviors of the targeted customers to determine whether the coupons are being used for purchases and to provide feedback for future clustering.

In some implementations, the user interfaces 212, 218, including the output interface 222, may be custom-designed user interfaces that facilitate some portion of the overall activity and, in some cases, may be used by multiple users with different roles. As such, the analytics system 200 may coordinate and facilitate a distributed process of cluster generation and evaluation, and streamline the tasks and roles that potentially involve the participation of multiple people.

It should be appreciated that while clustering is primarily described, other various techniques may also be provided. These may include modeling, simulation, predictive analytics, use of knowledge graphs, as well as various other statistical or data-driven approaches. Any technique that may facilitate decision-making, conversational response generation, scheduling, customer routing, pattern recognition, natural language processing (NLP), and/or machine learning may also be provided in the artificial intelligence (AI) based omnichannel communications system 100 and/or analytics system 200. Ultimately, the analytics system 200 may monitor and analyze data exchanged in an enterprise network to streamline an online application process, all the while minimizing risk to an organization entity and enhancing ease of use for users.

Figure 3:
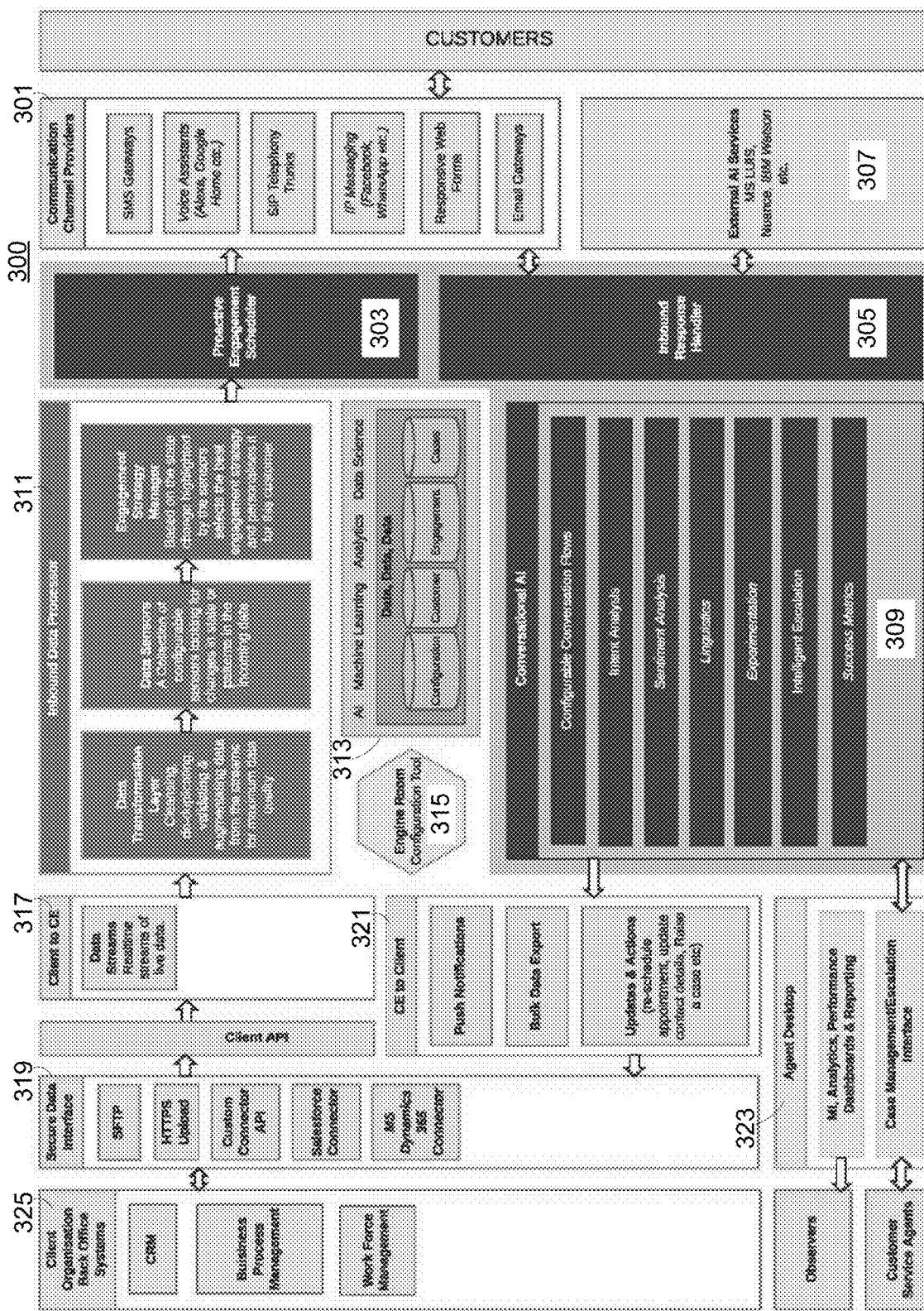
FIG. 3 illustrates a block diagram for artificial intelligence (AI) based omnichannel communications, according to an example.

FIG. 3 illustrates a block diagram 300 for artificial intelligence (AI) based omnichannel communications system, according to an example. As shown, the block diagram 300 may include communication channel providers 301 that communicate with customers. The communications channel providers 301 may include SMS gateways, voice assistants, SIP telephony trunks, IP messaging, responsive web forms, email gateways, or other conversational entities. The communications channel providers 301 may communicate with proactive engagement scheduler 303 and inbound response handler 305. The inbound response handler 305 may communicate with various entities, such as external AI services 307, or other third party sources. The inbound response handler 305 may also communicate with a conversational AI platform 309.

The conversational AI platform 309 may include various elements, such as configurable conversation flows, intent analysis, sentiment analysis, linguistics, experimentation, intelligent escalation, success metrics, and other elements. These elements may help facilitate human-computer interaction.

The proactive engagement scheduler 303 may also communicate with an inbound data processor 311, which may include a data transformation layer data sensors, and an engagement strategy manager. These elements may help process data for use in the overall system. For example, the data transformation layer may clean, validate, augment data for maximum data quality. The data sensors may look for or identify changes in state or patterns in data. The engagement strategy manager may select the next engagement strategy based on the state change highlighted by the sensors. This allows the conversation to be dynamic and personalized for each customer or user.

At the core may include an AI engine 313 for machine learning, analytics, data science, etc. Here, data may be used for configuration, customer, engagement, cases, or other AI-based technique. It should be appreciated that an engine room configuration tool 315 may also be provided.

The inbound data processor 311 may also communicate with a client to CE (customer equipment) 316, which may include various data streams received from a client API, which in turn communicates with secure data interface 319.

The secure data interface 319 may include SFTP, HTTPS upload, customer connector API, Salesforce connector, MS Dynamics 365 connector, or other interface.

A CE to client 321 may communicate with the conversational AI platform 309 and may include push notifications, bulk data export, and updates and actions, which may be used for rescheduling, appointments, update contact details, etc. The conversation AI platform 309j may also communicate with an agent desktop 323 that interacts with observers and customer service agents. The agent desktop 323 may include MI, analytics, performance dashboards, and reporting, etc. It may also include case management, an escalation interface or other user-friendly interface.

The secure data interface 319 may also communicate with a client organization back office system 325. The client organization back office system 325 may be where the CRM (or ERP) is housed, along with business process management, work force management, or other enterprise components.

Figure 4A:
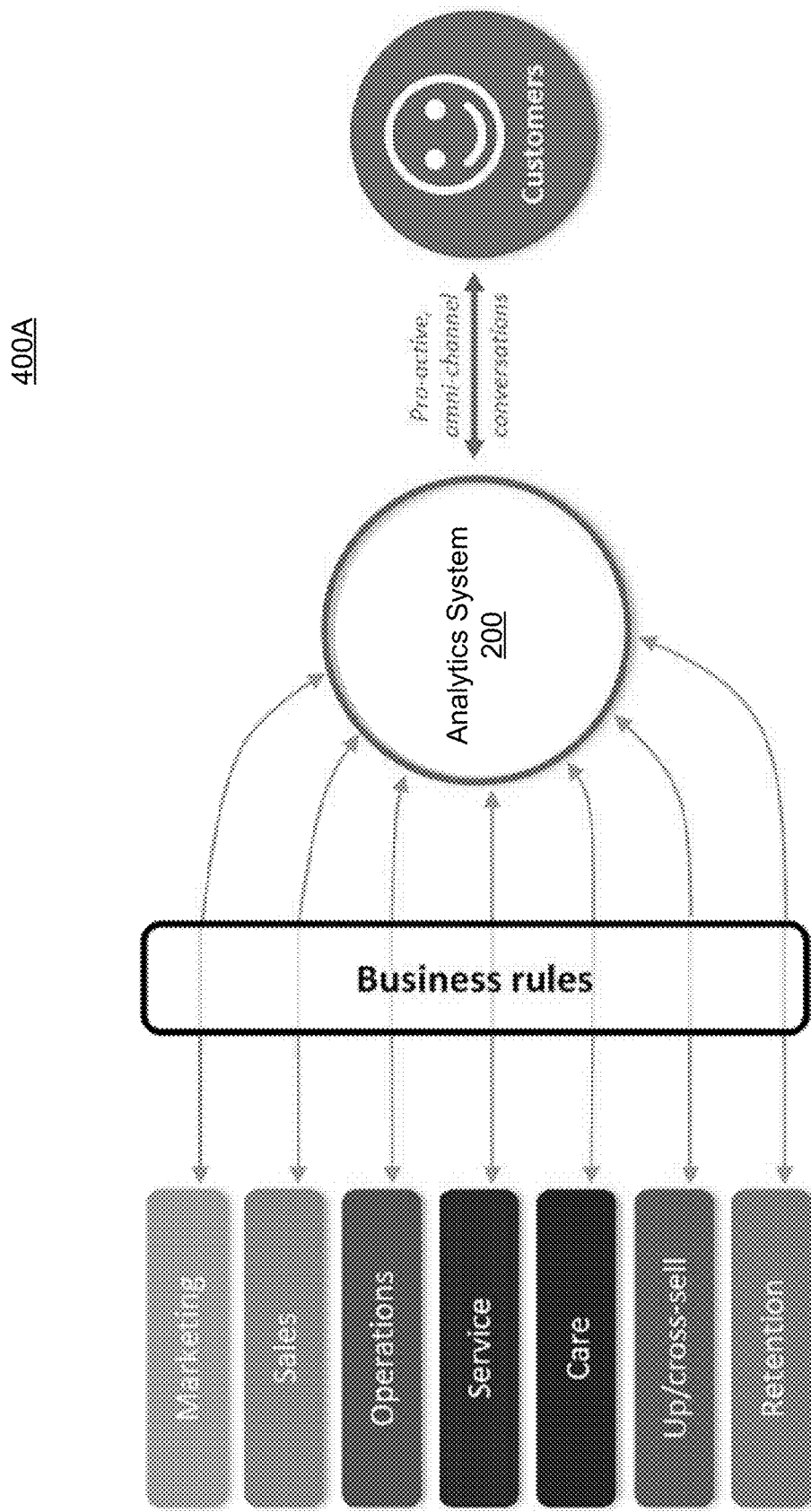
FIG. 4A illustrates a schematic diagram for omnichannel communication services and operations, according to an example.

FIG. 4A illustrates a schematic diagram 400A for omnichannel communication services and operations, according to an example. As shown, the artificial intelligence (AI) based omnichannel communications system 100 and/or analytics system 200 may implement a variety of business rules to provide proactive omnichannel conversations with one or more customers of an organizational entity. These business rules may enable various functions and applications, such as marketing, sales, operations, services, care, cross-selling features, retention, etc. Accordingly, the analytics system 200 of the artificial intelligence (AI) based omnichannel communications system 100 may provide conversations that are consistent across an entire customer journey, through time, and across various digital channels for enhanced customer experiences and business key performance indicator (KPI) impact.

The artificial intelligence (AI) based omnichannel communications system 100 and/or analytics system 200 may therefore provide powerful analytics that constantly evaluate performance against key metrics relating to both customer and organizational entity processes. This may help ensure and facilitate reliability and ability to identify opportunities for continuous improvement. The proactive nature of conversations provided by the artificial intelligence (AI) based omnichannel communications system 100 may rely on a continuous analysis of data from a variety of data sources. This may help device what conversation to have, with whom, when, and on what channel. Furthermore, this may help determine when to push back relevant updates to customer status to numerous systems and departments. Accordingly, the artificial intelligence (AI) based omnichannel communications system 100 may provide multiple APIs, and other mechanisms, to allow for seamless, real-time or near real-time data transfer and exchange.

The artificial intelligence (AI) based omnichannel communications system 100 may also provide a scheduler feature that may turn client and customer-specific data into micro-personalized conversations. These may be tailored to an individual customer by each of channel, day, content, and previous behavior. The result may be high customer engagement (e.g., 90%+) superior to that of manual call centers along with a more highly-rated customer experience. An ability to configure new journeys, make real-time or near real-time adjustments, trial different strategies, and monitor results may also allow a customizable approach to deliver enhanced user experience and journey at the artificial intelligence (AI) based omnichannel communications system 100. By engaging in intelligent and timely proactive customers, customer experience is maximized, and business KPI may be met or exceeded.

Figure 4B:
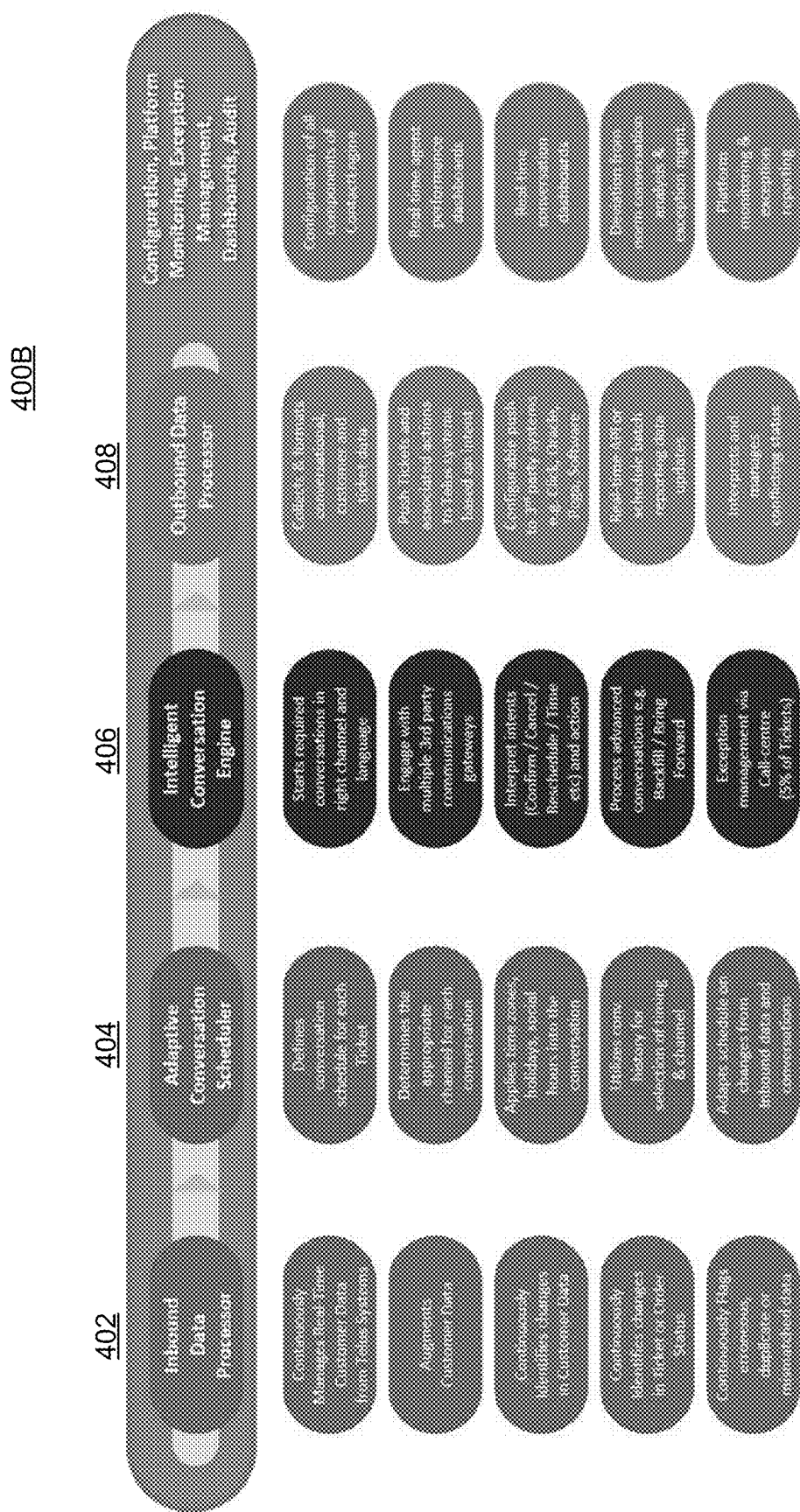
FIG. 4B illustrates a data flow for artificial intelligence (AI) based omnichannel communication, according to an example.
Figure 5A:
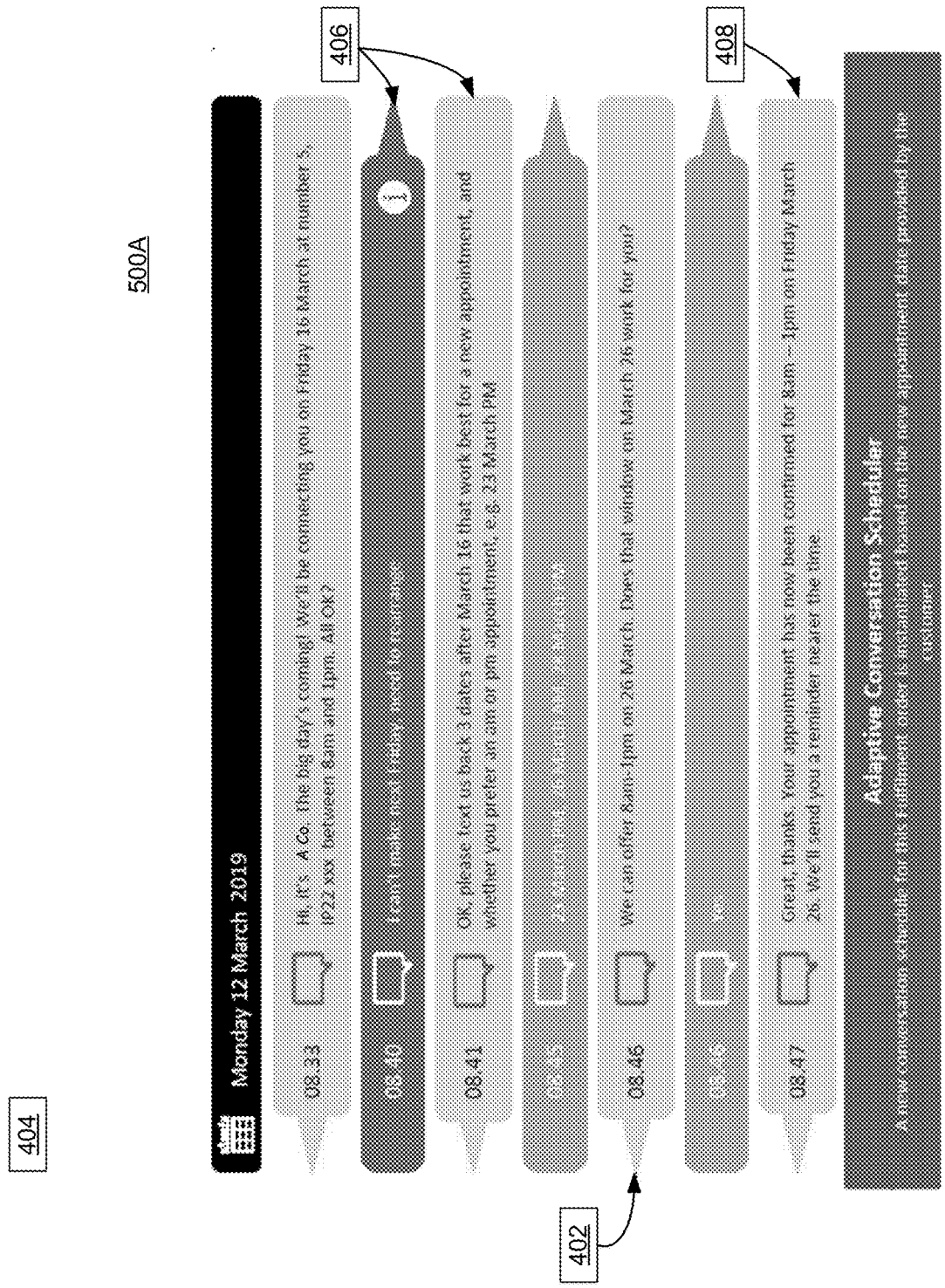
FIGS. 5A-5G illustrate screens for digital content security and communication, according to an example.
Figure 5B:
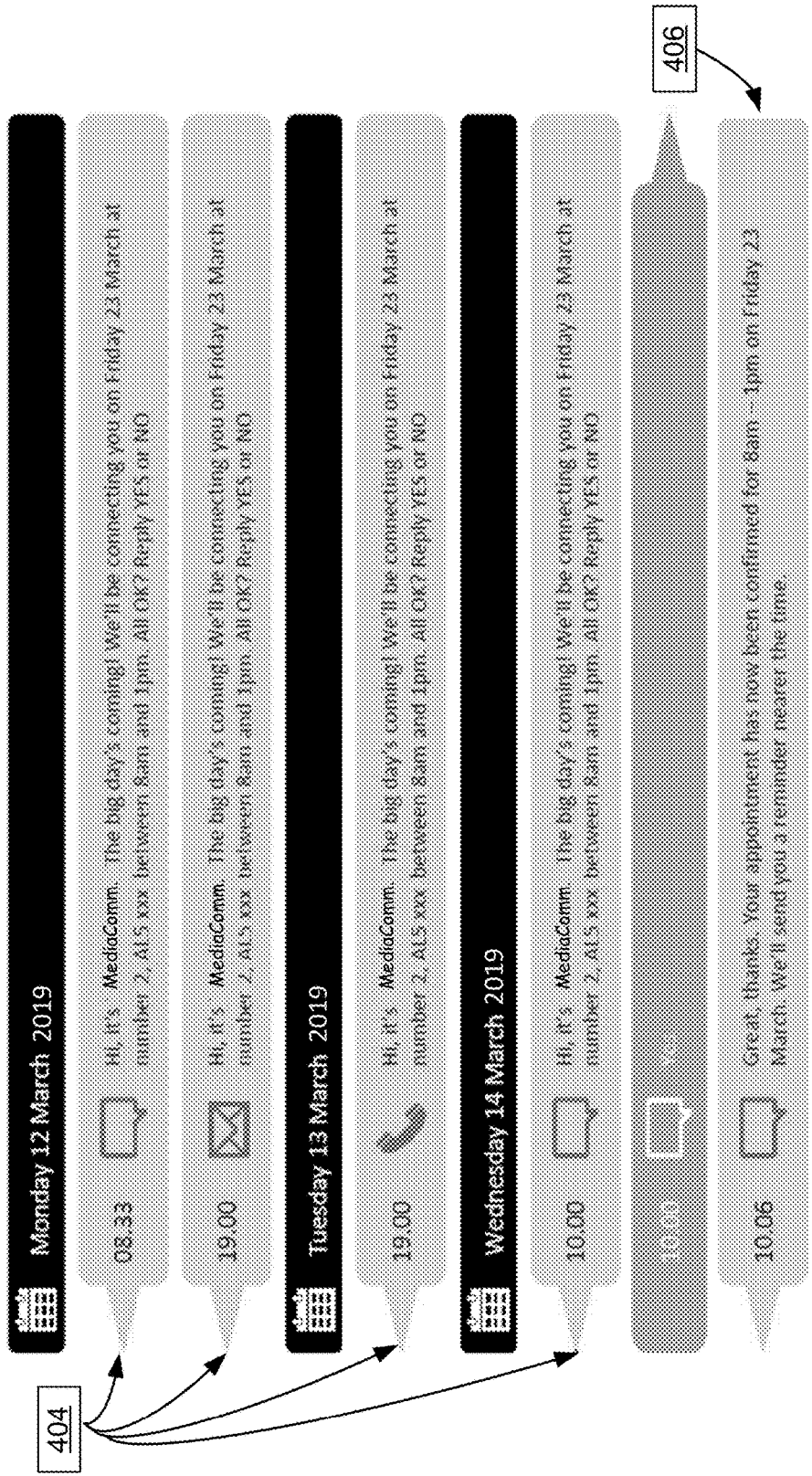
Figure 5C:
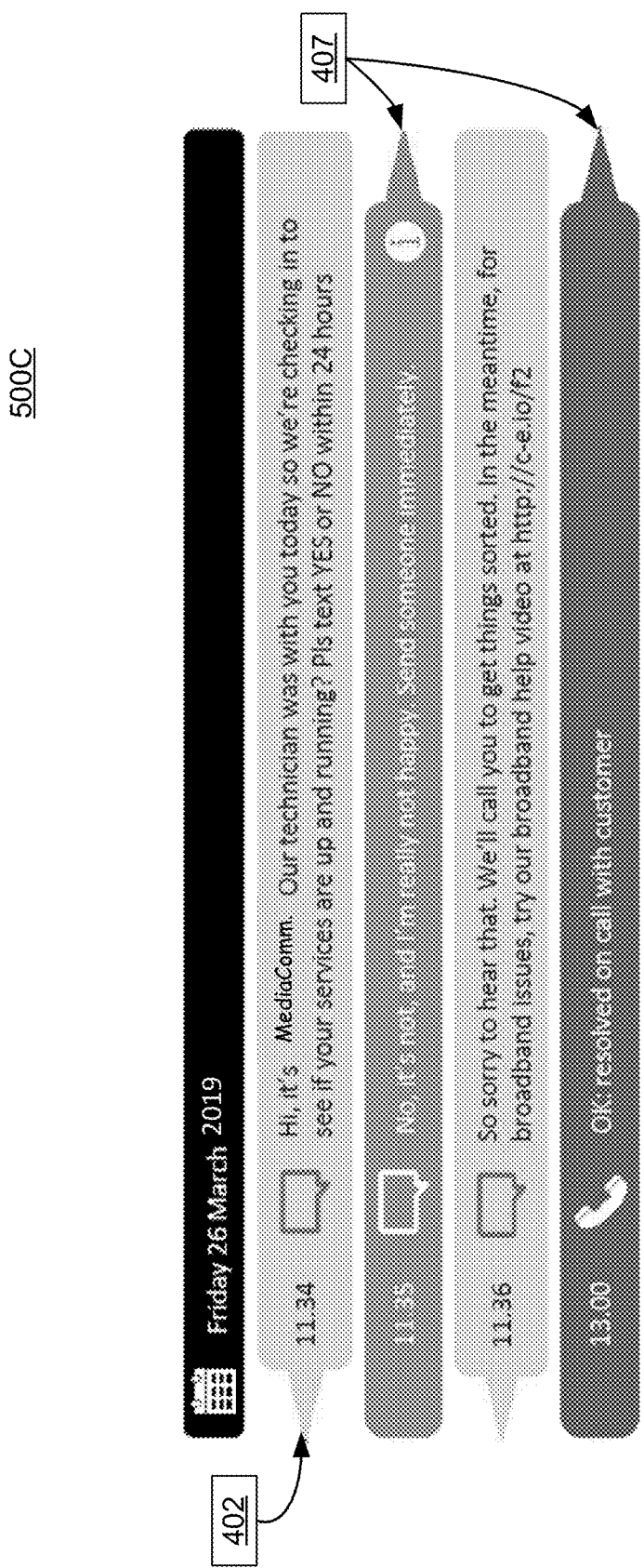
Figure 5D:
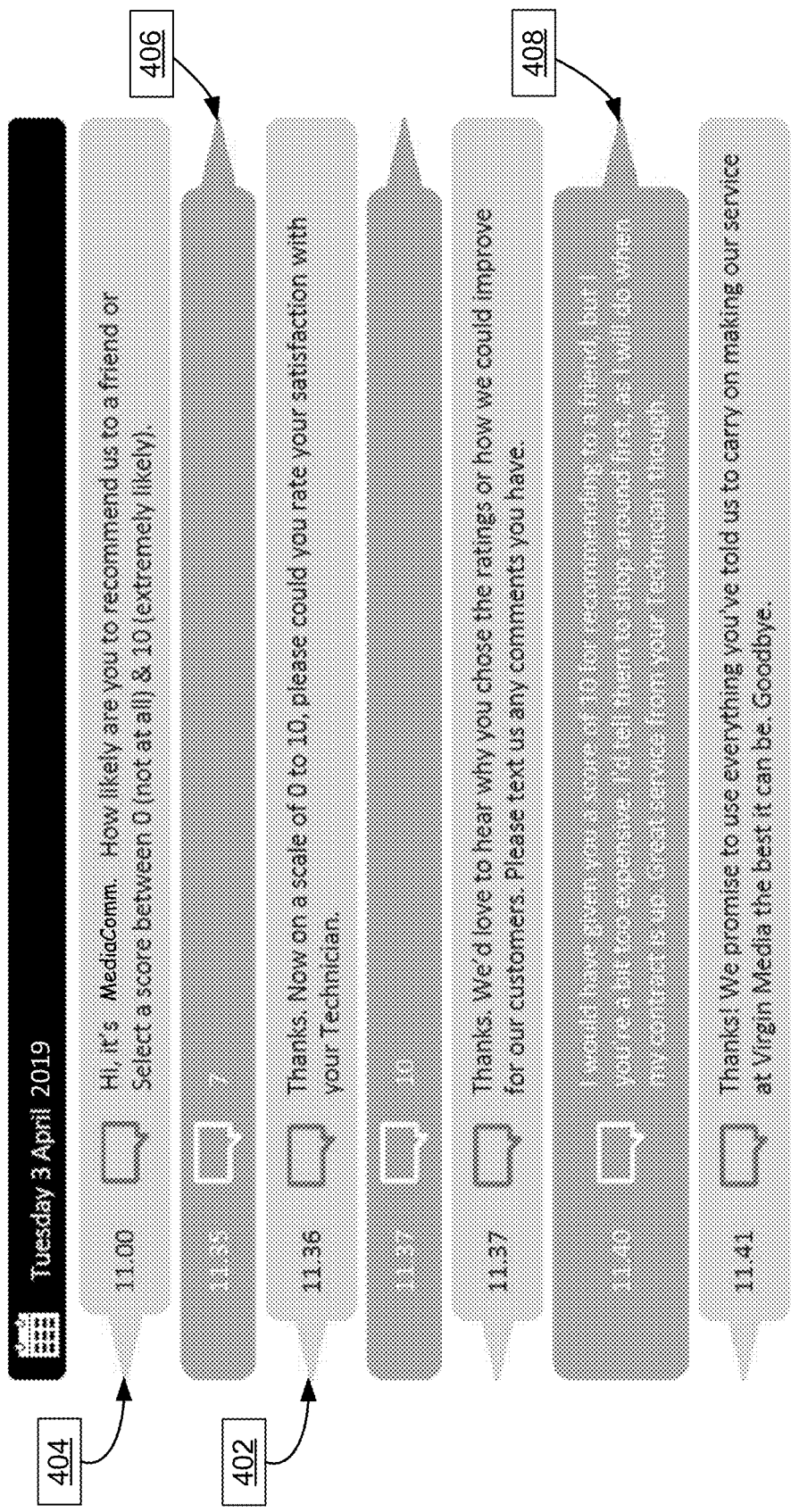
Figure 5E:
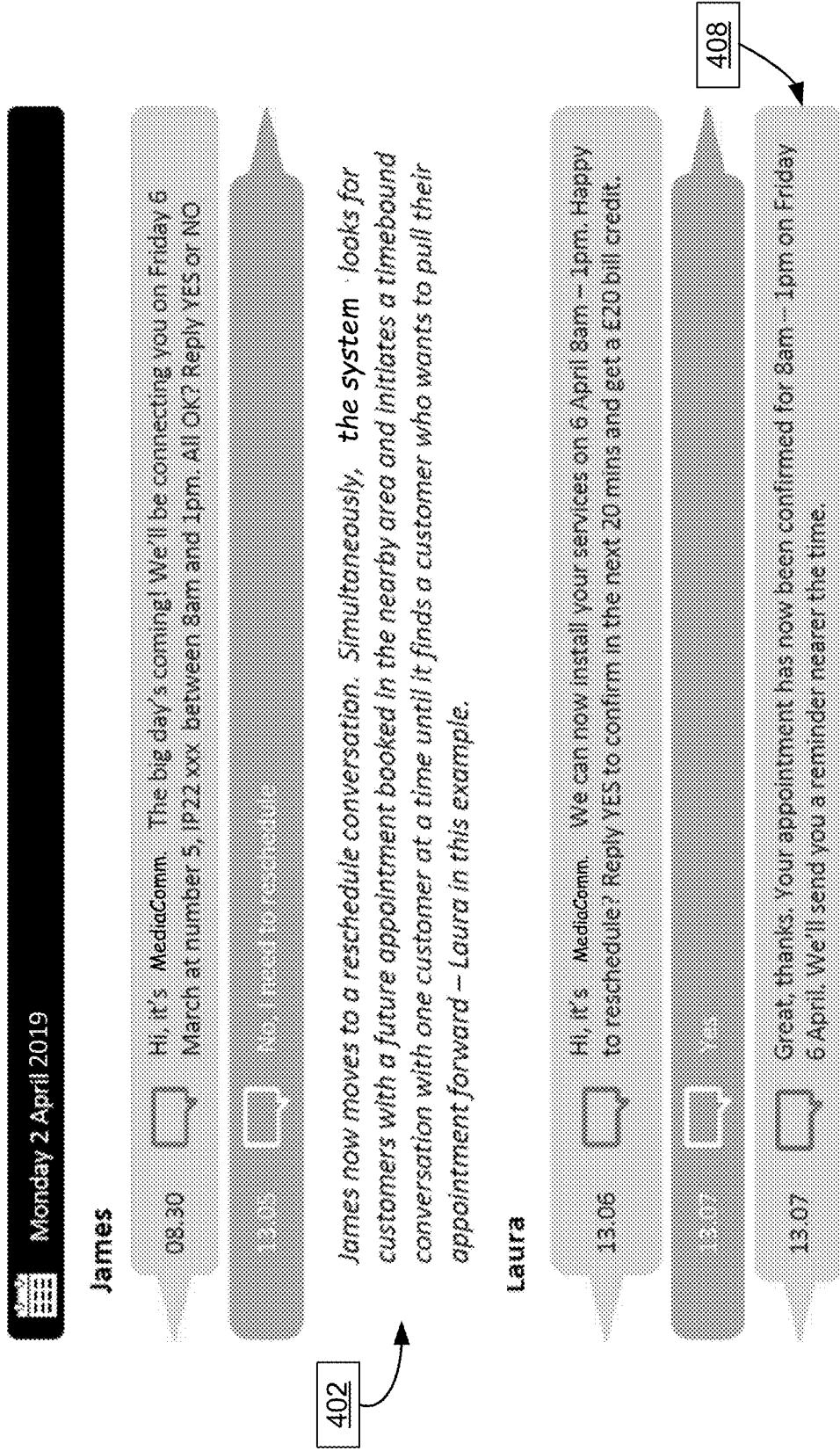
Figure 5F:
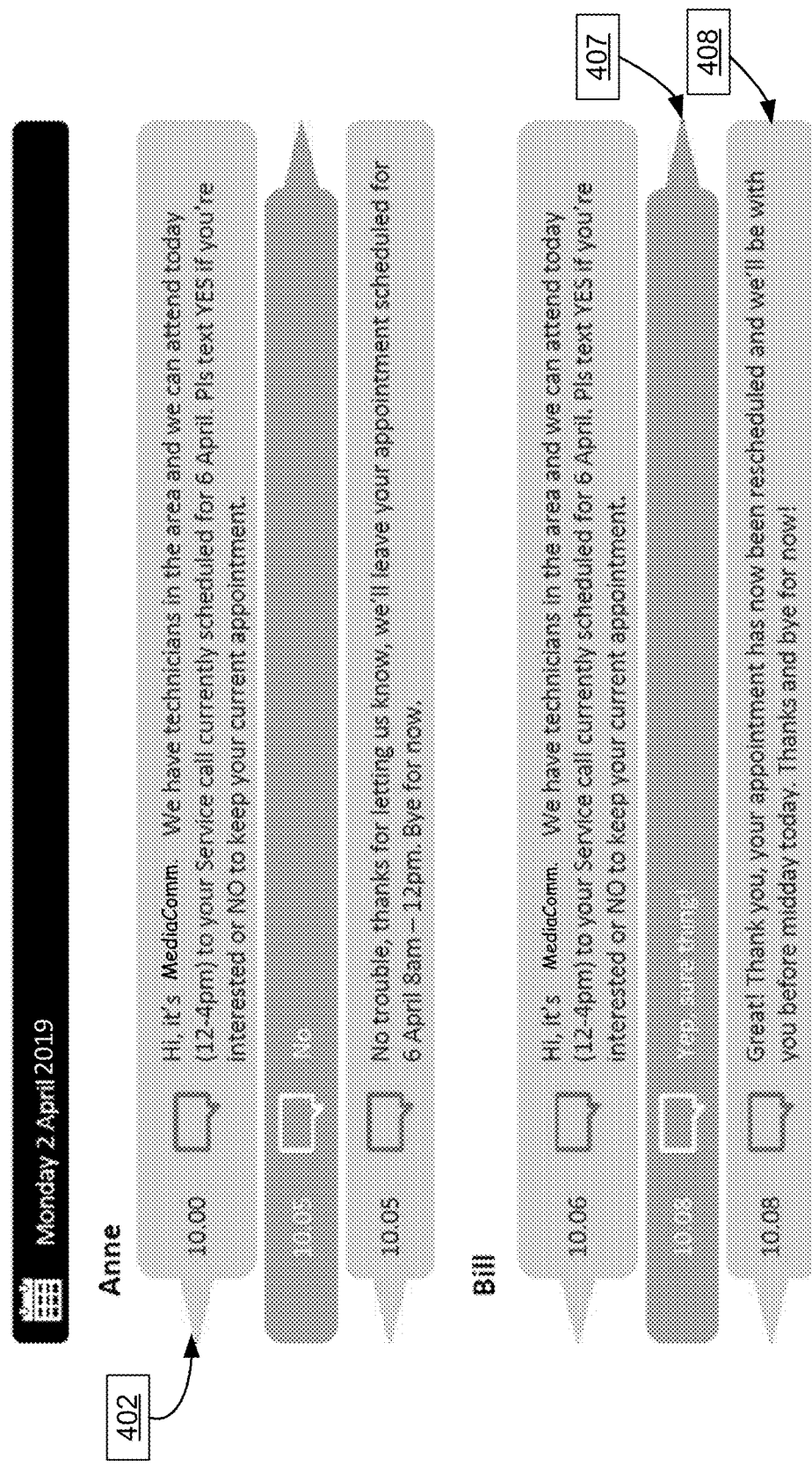
Figure 5G:
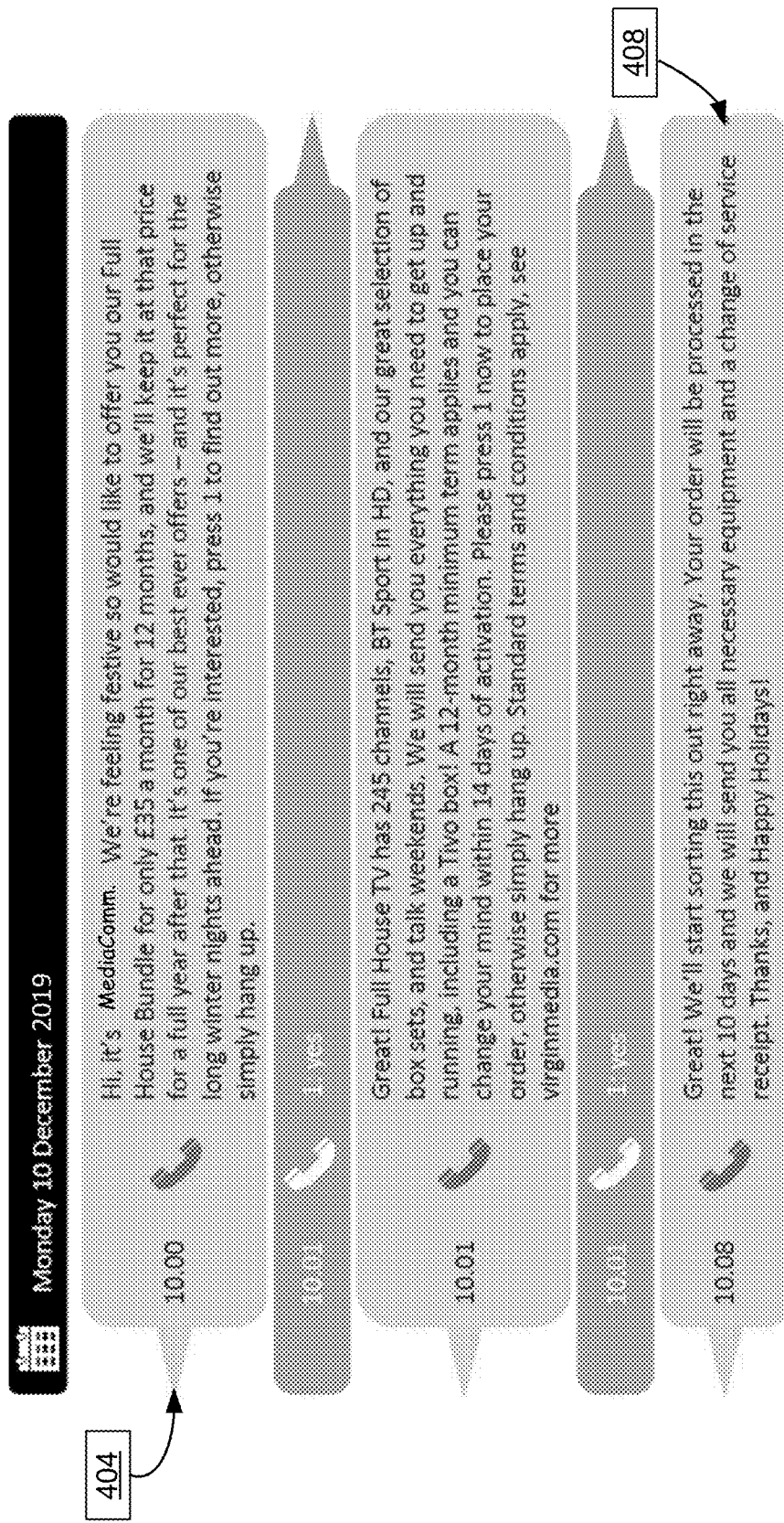

FIG. 4B illustrates a data flow 400B for artificial intelligence (AI) based omnichannel communication, according to an example. As shown, the artificial intelligence (AI) based omnichannel communications system 100 may facilitate and process data in such a way that has business KPI performing at scale through various functions. The analytics system 200 may include various data stops, including an inbound data processor 402, an adaptive conversation scheduler 404, an intelligent conversation engine 406, and an outbound data processor 408. In some examples, an AI exception manager (not shown) may also be provided.

The inbound data processor 402 may support any input data format and may include real-time or near real-time data integration using one or more data feeds. For instance, at the inbound data processor 402, data may be continuously managed in real-time or near real-time from various systems. In an example, the inbound data processor 402 may be used in conjunction with a variety of business systems (e.g., CRM/BSS/OSS). Moreover, data may be augmented, changes or ticket status may be continuously identified, and various errors, duplicate, or mismatched data may be flagged continuously. These and other functions may be performed at inbound data processor. For example, these may include augmenting client lookup tables or third party data, manage data quality and de-duplication, and consistently monitor processing and state changes.

In an example involving telecommunication organization entities performing installations or repairs, the inbound data processor 402 may help ensure conversations are accurate, never duplicated, and visible to various users and parties. Augmented customer data may be provided through interfacing third party systems to enable correct content for the right channel (e.g., validity of customer contact information, landline vs. wireless, best time for communication, etc.). Conversations may be scheduled with all necessary information and configurations, such as device type, language, and/or other conversational requirements.

The adaptive conversation scheduler 404 may be provided to help define conversation schedule for each ticket. In addition, the appropriate channel for each conversation may be determined. This may entail application of time zone, holidays, social hours, and other various nuances. Conversation history for selection of timing and/or channel may also be taken into consideration. Schedules may be adapted based on changes from inbound data and/or conversations as well. By establishing appropriate conversations with users and prioritizing most time-sensitive conversations, customer engagement may be optimized. Furthermore, in some examples, the adaptive conversation scheduler 404 may use multiple delivery partners with automatic fail-over.

In a telecommunications example, the adaptive conversation scheduler 404 may help define conversation schedule across lead time of ticket, include all potential touchpoints (e.g., bookings, confirmation, reminders, etc.), and adapt schedules based on changes within either inbound data (e.g., new address) or ongoing conversations (e.g., rescheduling).

Data may be processed by an intelligent conversation engine 406 within the analytics system 200, which may initiate conversations in the appropriate channel and/or language. Multiple third-party communication gateways may be engaged. Furthermore, intents and actions may be interpreted using a variety of processing techniques as described herein. These may also include various functions, such as confirmation, cancellation, scheduling, etc. Advanced conversations may also be processed, including backfilling, bringing forward, etc. Moreover, exception management via call center may be provided. Although not a high number (e.g., 5% of calls), these may provide other options and avenues for customer experience and solution delivery.

The intelligent conversation engine 406 may be fully scalable to provide numerous omnichannel communications per day, each conversation being executed with AI-enabled understanding and rapid responses (e.g., <0.5 seconds). Conversations may be managed to successful conclusions and result in expedient customer resolution.

In an outbound data processor 408, as shown, various conversation, customer, and ticket data, for example, may be collected and formatted. This may be achieved at the analytics system 200 or other component of the artificial intelligence (AI) based omnichannel communications system 100. Tickets and various associated actions may be pushed to other system components, based on determined intent or other rules or data. The outbound data processor may also provide a configurable push to third-party systems, such as Click, Oracle, Pega, Software, etc. Real-time or near real-time API or scheduling batch reporting data updates may also be provided. Also, any conflicting status may be interpreted and/or managed by the outbound data processor.

By processing data in this way using various customer conversations APIs, the artificial intelligence (AI) based omnichannel communications system 100 may therefore provide configuration, platform monitoring, exception management, dashboards, auditing, and/or other various conversation applications and features organizational entities with their customers. In some examples, configuration of components may reside with the artificial intelligence (AI) based omnichannel communications system 100. Real-time or near real-time agent performance dashboards may provide high user interactivity. These may also include conversation dashboards. Deviation from normal conversation analysis and exception management may also be provided, along with a host of other various functions and features relevant to conversation analytics.

FIGS. 5A-5G illustrate screens 500A-500G for digital content security and communication, according to an example. As shown in 500A, a conversation screen for in-channel rescheduling may be depicted. Here, through a conversation with a customer, the intelligent conversation engine 406 of the analytics system 200 may recognize a customer's intent, using various AI-based techniques, such as machine learning, clustering, and/or NLP, a customer's intent to reschedule a particular service (e.g., network provisioning). The inbound data processor 402 may provide a real-time or near real-time connection to back-end workforce planning applications that may enable presentation of available dates and confirm dates requested. The outbound data processor 408 may provide automatic or near-automatic notification of the request timeslot to one or more workforce planning systems, such as CRM or other system. By deducing the customer's intent in a single customer conversational sequence may reduce need for any human intervention, which may be cumbersome and resource-intensive, and immediately allow the customer request to be rescheduled through workforce integration.

As shown in 500B, a conversation screen for a non-responder may be depicted. Here, through a conversation with a customer, the analytics system 200 may give a customer every opportunity to respond, but does so intelligently across several days and/or channels. For example, the adaptive conversation scheduler 404 may attempt to initiate a conversation with a customer about a scheduling issue using a tailored sequence of times and channels, as shown. Once the customer responses, the intelligent conversation engine 406 of the analytics system 200 may recognize the customer's response and use that same channel to immediately converse with the customer.

As shown in 500C, a conversation screen for post-call check may be depicted. Here, through a conversation with a customer, the analytics system 200 may provide a seamless post-conversation check to ensure a customer's network service provisioning, for example, is up and running. The inbound data processor 402, for instance, may initiate a conversation immediate after a home visit by a technician. This may occur when a system at the organizational entity marks the job as complete. The analytics system 200 may include a AI exception manager 407, which may flag the conversation for human agent intervention as the intelligent conversation engine 406 may deduce, using AI-based and language techniques, that the customer is an irritated state. The human agent may be call or chat with the customer immediate and handle his or her issues. The outbound data processor 408 may recognize this action and may update systems automatically.

As shown in 500D, a conversation screen for an NPS survey may be depicted. A net promoter score (NPS) survey may be provided to customers to receive feedback about various goods or services. In service delivery, these may be challenging to obtain. However, through a digital conversation with a customer, the analytics system 200 may be about to conduct a number of seamless NPS surveys and increase completion rates. For example, an adaptive conversation scheduler 404 may identify a completed appointment and initiate an NPS conversation, perhaps the day after service delivery. The intelligent conversation engine 406 may respond quickly (e.g., 0.5 seconds) to help ensure survey completion rates. In an example, the inbound data processor 402 may help identify the technician who served the customer. The outbound data processor 408 may use NLP or other techniques to help decipher the feedback. In an example, the ERP or CRM may be updated to show customer considers a product too expensive, e.g., likely churn risk. This may affect marketing strategies to this customer or similar-situated customers, as well as product or service improvement, etc.

As shown in 500E, a conversation screen for auto-filling empty slots due to a cancellation may be depicted. The analytics system 200 may recognize a cancellation or reschedule request and, while arranging a new appointment, it may simultaneously pull a job forward to fill the empty slot. For example, once it is determined a reschedule is needed, the inbound data processor 402 may identify customers with a future appointment in the same geographic area to initiate a time bound conversation with as many customers as needed to pull their appointment forward (e.g., Laura to take James' previous appointment slot). The outbound data processor 408 may then update the empty slot, now filled, and ultimately optimizing technician utilization, without human intervention throughout the conversation process.

As shown in 500F, a conversation screen for auto-filing empty slots due to no access may be depicted. Here, if a technician, for example, notifies an organizational entity (e.g., a network service provider) that a customer was not on premises for a particular installation, the analytics system 200 may look to bring forward a job in the nearby area one customer at a time. For example, the adaptive conversation schedule 404 may reach out to Anne and initiate a conversation to see if the can forward fill her services to the now vacant slot left by the no-show. She cannot. The analytics system 200 may do reach out to as many customers as necessary. In this case, Bill can take the vacant timeslot. The AI exception manager 407, in an example, may use NLP and other AI-based techniques to recognize his response "yep" to mean "yes" and respond accordingly. The outbound data processor 408 may then update system and fill the vacant timeslot, ultimately optimizing technician utilization, without human intervention throughout the conversation process.

As shown in 500G, a conversation screen for running marketing or sales campaigns may be depicted. Here, the analytics system 200 may deploy marketing campaigns across either a broad customer base or target specific customers. For example, the adaptive conversation scheduler 404 may run several different campaigns (content, tone of voice for variation, etc.) at once and monitor performance of each on, giving companies the ability to identify a most effective messaging method to customers. Upon positive feedback or response, the outbound data processor 408, for example, may notify and update systems and proceed with processing a customer's order for goods or services.

Figure 6:
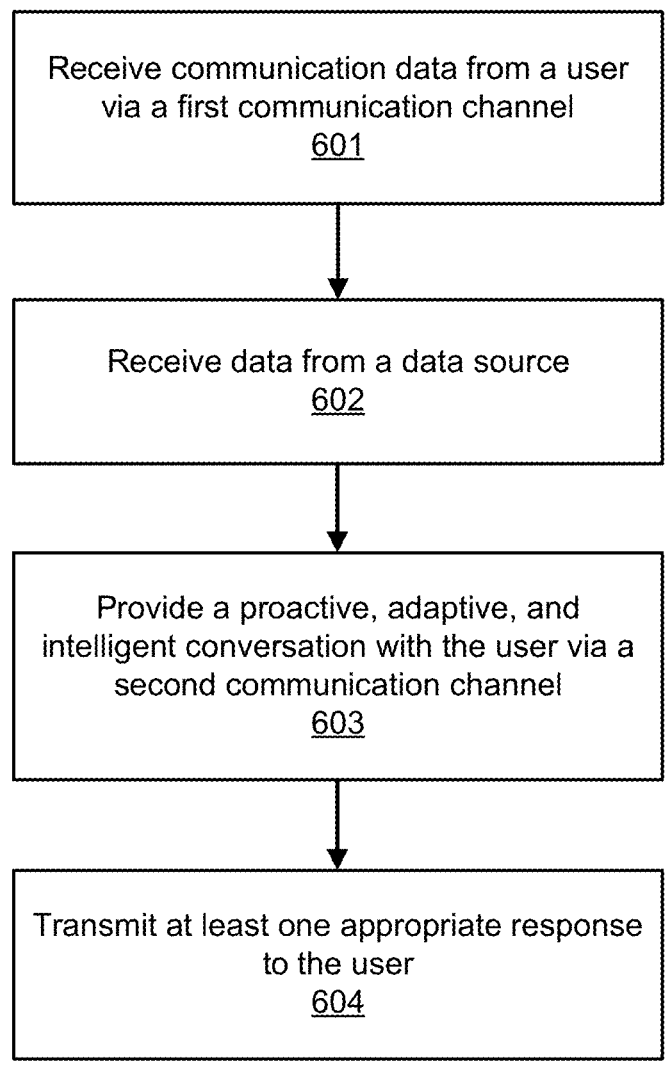
FIG. 6 illustrates a flow chart of a method for artificial intelligence (AI) based omnichannel communication, according to an example.

FIG. 6 illustrates a flow chart of a method 600 for artificial intelligence (AI) based omnichannel communication, according to an example. The method 600 is provided by way of example, as there may be a variety of ways to carry out the method described herein. Although the method 600 is primarily described as being performed by system 100 as shown in FIG. 1 and/or system 200 as shown in FIG. 2, according to data flow of FIG. 4B, the method 600 may be executed or otherwise performed by other systems, or a combination of systems. Each block shown in FIG. 6 may further represent one or more processes, methods, or subroutines, and one or more of the blocks may include machine-readable instructions stored on a non-transitory computer readable medium and executed by a processor or other type of processing circuit to perform one or more operations described herein.

At block 601, the data access interface may receive communication data. This communication data may be received from a user via a first communication channel. In some examples, the communication channel may include at least one of telephone, email, simple message service (SMS), mobile device application, video conference, website, digital conversational entity, social network platform, or other channel.

At block 602, the data access interface or processor may receive data from a data source. In some examples, the data source may include a website, a document, enterprise resource planning (ERP) system, a database, a web feed, a sensor, a geolocation data source, a server, an analytics tool, a mobile device, a reporting system, or other data source. It should be appreciated that this data may provide additional context for improving conversation with a user.

At block 603, the processor may provide a proactive, adaptive, and intelligent conversation with the user. This conversation may be provisioned via a second communication channel. In some examples, the conversation may be a multilingual conversation based on the data received from the user and/or information identifying the user. In some examples, the second communication channel may be a secure communication channel. Furthermore, the second communication channel may be identical to the first communication channel and/or based on preference data received from the user and/or information identifying the user. It should be appreciated that the proactive, adaptive, and intelligent conversation may also be provided to the user at a user device, In some examples, the proactive, adaptive, and intelligent conversation may include parsing, by the processor, the communication data from the user. It should be appreciated that parsing the communication data may include any number of data processing techniques. For example, document object model (DOM) parsing, natural language processing (NLP), data caching, or other technique may be used. In addition, the processor may also: determine user intent from the parsed communication data, determine at least one appropriate response to a user query based on the determined intent and data from the data source, and generate the at least one appropriate response responsive to the user query. It should be appreciated that may apply at least one AI-based technique for any of these actions. In examples, the AI-based technique may be a based on a deep machine learning model using a convolutional neural network (CNN).

The processor may also coordinate at least one action to provide a good or service to the user. In some examples, the at least one action may include scheduling an appointment, confirming an appointment, cancelling an appointment, presenting a sales or marketing opportunity, selling a good or service, collecting more data or information with regard to the user or a user inquiry, providing the user with information responsive to the user inquiry.

At block 604, the output interface may transmit the at least one appropriate response to the user at a user device. In some examples, this may be achieved via a digital conversation entity via any number of communication channels.

Figure 7:
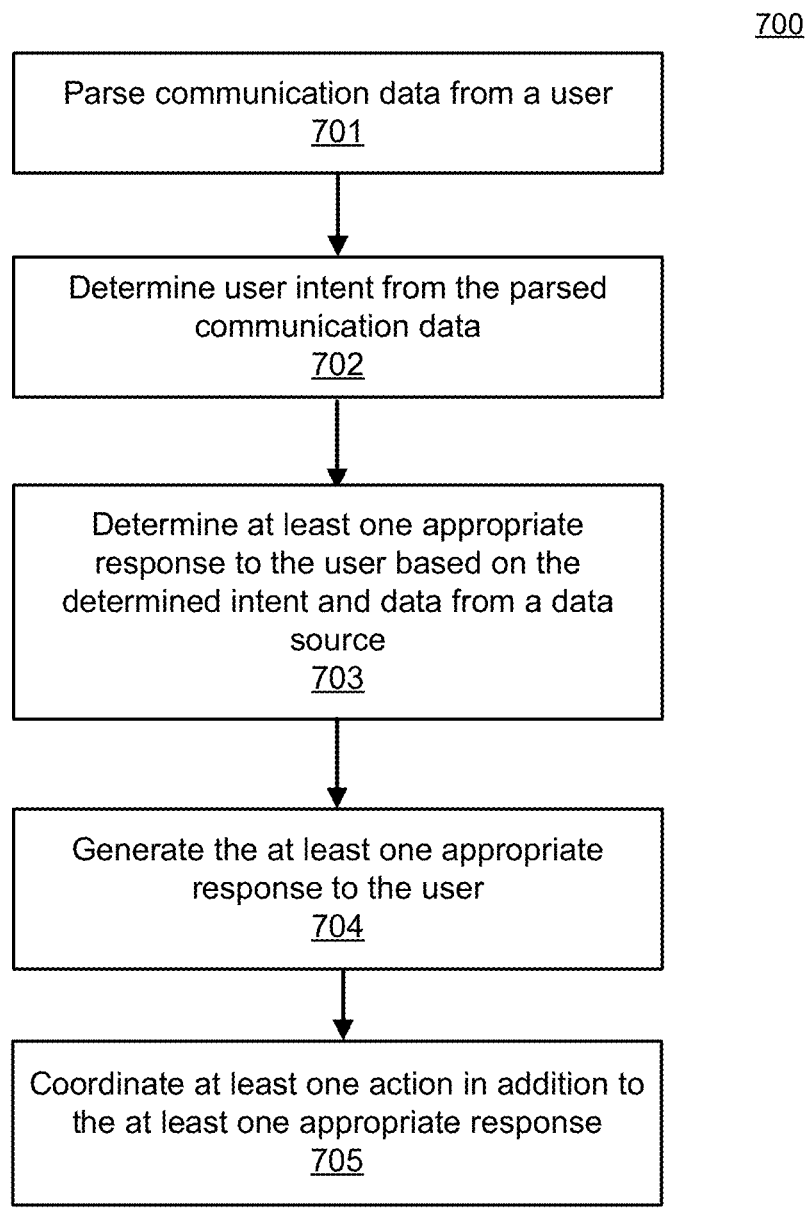
FIG. 7 illustrates a flow chart of a method for artificial intelligence (AI) based omnichannel communication, according to an example.

FIG. 7 illustrates a flow chart of a method 700 for artificial intelligence (AI) based omnichannel communication, according to an example. The method 600 is provided by way of example, as there may be a variety of ways to carry out the method described herein. Although the method 700 is primarily described as being performed by system 100 as shown in FIG. 1 and/or system 200 as shown in FIG. 2, according to data flow of FIG. 4B, the method 700 may be executed or otherwise performed by other systems, or a combination of systems. Each block shown in FIG. 7 may further represent one or more processes, methods, or subroutines, and one or more of the blocks may include machine-readable instructions stored on a non-transitory computer readable medium and executed by a processor or other type of processing circuit to perform one or more operations described herein.

At block 701, in order to provide a proactive, adaptive, and intelligent conversation with the user via any number of communication channels, the processor may parse communication data from the user. In some examples, the conversation may be a multilingual conversation based on the data received from the user and/or information identifying the user. In some examples, the communication channel may be a secure communication channel. Furthermore, the communication channel may be based on preference data received from the user and/or information identifying the user. It should be appreciated that parsing the communication data may include any number of data processing techniques. For example, document object model (DOM) parsing, natural language processing (NLP), data caching, or other technique may be used.

At block 702, the processor may determine user intent from the parsed communication data. At block 703, the processor may determine at least one appropriate response to a user query based on the determined intent and data from the data source. At block 704, the processor may generate the at least one appropriate response responsive to the user query. It should be appreciated that may apply at least one AI-based technique for any of these actions. In examples, the AI-based technique may be a based on a deep machine learning model using a convolutional neural network (CNN).

At block 705, the processor may also coordinate at least one action to provide a good or service to the user. In some examples, the at least one action may include scheduling an appointment, confirming an appointment, cancelling an appointment, presenting a sales or marketing opportunity, selling a good or service, collecting more data or information with regard to the user or a user inquiry, providing the user with information responsive to the user inquiry.

It should be appreciated that proactive engagements with other computer systems may fall into three (3) general categories: (1) Sending information to a remote system; (2) Requesting information from a remote system; and (3) Performing a transaction with a remote system. An example of (1) may include scenarios where there is an interaction with a customer and this information may be logged against a customer record in a parent CRM system. In this way, a 360 degree view of the customer may be maintained. An example of (2) may include scenarios when a customer indicates a desire to reschedule and the system may engage with a work order management system to request a list of available appointment slots. An example of (3) may include scenarios where a customer indicates that his or her appointment is no longer required. Here, the system may automatically engage with a work order management system to cancel the appointment.

The exact nature of these engagements may vary depending on the remote system. For instance, the system 100 may have built-in integrations to a growing number of well-known back office systems. These may include Microsoft® Dynamics, Salesforce®, or other systems. The system 100 may also expose a secure API for organizations wishing to build their own integrations. Any engagements taking advantage of API or the built-in integrations may be fully managed through configuration. For less common or proprietary systems, the system 100 may add a thin translation layer to make the connection.

Where the engagement target is an individual, a more intelligent and adaptable approach may be needed, as there may be no clearly defined 'rules of engagement.' Thus, the system described herein may include a powerful dialogue engine capable of conducting a fully- or semi-automated conversation with an individual, or other entities, with the following core competencies:

Two-way: May supports sending of messages and intelligent handling of responses.

Omni-channel: May supports existing digital channels such as SMS, Email, Voice calls, Web forms, IP Messaging, voice assistants, social media, Smartphone apps etc. as well as providing a framework that is easily extended to embrace new channels as they emerge.

Multi-lingual: The same conversation may be configured in multiple languages and the language can then be matched to that of the customer.

Fully connected: The flow of the conversation may be interrupted or redirected at any time based on new information. This may be new information from the data sensors, from the customer or any of the other key actors in the process.

Rich Content Support: May employ a multi-part content model that supports text, images, audio & video as well as interactive elements such as buttons & links. Also may be capable of composing & sending rich content as well as receiving and understanding rich responses to the degree to which these are supported by the active communication channel.

Personalized, Contextual Content: May support templating so a standard message can be personalized to fit a specific customer or adjusted to fit the current context (e.g., time of day, time till appointment, work order status).

Natural language based intent identification: A critical component of the dialogue engine may be its ability to understand natural language. Thus, may employ state of the art artificial intelligence techniques to analyse the verbatim responses received and calculate the discreet intents they contain with associated confidence levels. Through configurable business rules the system may then determine the appropriate action for a particular intent or combination of intents without the need for human intervention.

Sentiment Analysis: In addition to intent identification within natural language responses, the system may also analyses the sentiment of verbatim messages. This sentiment information can be combined with the intent data in deciding upon the direction the conversation should take next.

Data Extraction: Where the response from an individual is complex like a longer textual response or a picture, the system may use a combination of artificial intelligence techniques to extract discreet data items from the complex content, e.g., reading a serial number of an appliance from a photograph of the boiler plate or detecting a warning light from a picture of a car instrument panel, or extracting a specific date from a verbatim reschedule request.

Configurable Conversation Flow: The majority of real life conversations may go beyond a single exchange (prompt & response). More frequently they may be a sequence of exchanges, each influenced by the exchanges that have already taken place as part of this conversation. Moreover, if the conversation is taking place over a period of time and in a changing environment, the flow of the conversation may adapt to take account of those changes. The system's conversation flows may allow configuration of all the possible threads that a particular conversation may encompass along with all the business rules necessary to define which route the conversation should take as critical events occur, be that a response from the individual or new information from a data sensor.

Linguistic Variation: The language used for attempting to communicate with someone may have a significant effect on our success. This may be particularly true when attempting to influence someone or encourage compliance with a key process step. The system may allow us to define multiple variations of a particular conversation flow employing different linguistic approaches tailored to different types of people. This may cover a multitude of aspects of written and spoken communication: tone, attitude, punctuation, capitalization, abbreviation, vocabulary, directness, friendliness, warmth etc.

The system may also include a powerful orchestration component which enables us to organize all these individual points of engagement into a coordinated process focused on achieving the key business objective. Through configuration, the following aspects of how these engagements are initiated and the interplay between them may also be provided:

Scheduling: The ability to define a schedule detailing which engagements need to happen at each critical stage in the process to ensure alignment between key individuals and entities.

Time-zones: Sensitivity to the time zone of the person being contacted and translation of schedules into the correct time & date for that time zone. The system may also use a built-in understanding of anti-social hours for each communication channel and may apply these in the time zone of the target individual.

Timing: The exact timing of an engagement may be pre-determined or in the case of human engagement, the system may calculate the optimum time for engagement that is most likely to achieve the desired result, based on past experience or the characteristics of the individual being contacted.

Communication Channel: As with timing, the choice of channel or channels may also be pre-determined or may be left up to the system to calculate.

Contact Point: Where there is more than one contact point (fixed line number, mobile number, email address, social media ID etc.) defined for an individual, there may be a number of choices. For example, an explicit contact may be identified to be used or the system may choose based on past success, or, in the case of individuals not previously communicated with before, various experimentations may be performed to determine the "best" contact option.

Persistence: Where a human engagement has a specific objective crucial to the continuation of the process, a retry strategy may be defined in the event the desired outcome on the first attempt is not obtained. The number of attempts may be predetermined, as well as the timing of those attempts, the communication channel used, and the specific contact point used (e.g., if there are two mobile numbers the system may try one then the other, or the system may first try the SMS first and then switch to a voice call to a landline, etc.)

Linguistic Approach: Where the conversation flow linked to a particular engagement objective has multiple linguistic variants, an approach may be selected to use explicitly or write a business rule to match the linguistic approach to the characteristics of the individual.

Personalization: In reality, for any given business objective, there are multiple engagement patterns including variations of all the above criteria optimized for different scenarios and types of individual. The system may use a combination of pre-defined business rules and learned behavior to select the optimum pattern in each case.

Experimentation: When building engagement patterns and strategies to meet a new business objective, there may not be the benefit of historic behavior immediately available to optimize. In these scenarios, the system may allow multiple engagement patterns employing different approaches to be built and established. A subset may be defined on which to test that approach and measure its success. With continued experimentation over time the system may learn the best strategy for each scenario or people type.

Adaptation: As each engagement pattern is tailored to a specific scenario or people type, if at any time the scenario or core information about a person changes based on new information from the data sensors, the system may switch to a new engagement pattern to match the new information giving us the highest probability of success.

While the system may be designed to deliver fully- or semi-automated business processes, there may be situations that arise that cannot be handled intelligently or sensitively by technology alone and need intervention from a human agent to ensure the success of the process and give a good customer experience. As a result, the system may allow identification of such situations and flagging these for escalation. Each escalation may be categorized and for each escalation category, a range of resolution options to guide the human agent's actions may be defined. The escalation itself may be handled either via the system's own case management tool or via integration with a back office system. The system's case management system, in some examples, may provide a great understanding about the current engagement process and has been designed specifically to handle cases arising from proactive customer engagement via digital communication channels. It knows about scheduling, it understands all the events that may have taken place along a particular customer journey, it understands the asynchronous nature of many digital communication channels etc.

When a particular case is resolved, the system may then take over again and with the new information provided by the agent can interrupt, re-start or re-direct the engagement strategy as required.

This collaboration between an AI based computer system and human agents is the key to a truly intelligent system. It protects us from the pain of technology over-reaching but also creates the perfect feedback loop to enable the AI system to learn over time how to automate tasks that currently require human intervention.

In order for the system to be able to learn and optimize its approach to achieving a particular business objective, it needs a clear understanding of success and failure. In addition, it also needs a clear view of the factors that may have influenced that success or failure. Central to system's continuous improvement capability may be the ability to define the characteristics of a successful journey making it measurable on a case by case basis. This information may then be combined with the system's advanced engagement metrics which track all aspects of the critical path taken to highlight sub-optimal elements in need of improvement. Through ongoing analysis of behavior and results, the system may continually refine its approach in search of the perfect customer journey.

Many of the core functions of the system may be event driven. These may include new data from a sensor, a response from a customer, a schedule event trigger, a case resolution from an agent, etc. Whenever an event occurs, then, the system may decide upon the most intelligent action in response to this event or the action that will get us closer to our business objective. The power of the system's intelligent decision making capability may be rooted in at least the following areas:

Data Organization & Aggregation: The system may pull together various information it has access to and may organize it to make it easily accessible to the decision making process. The key sources of information may include, but not limited to data streams, live engagements, historical engagements, public databases, acquired knowledge, etc.

Data Augmentation: In addition to having access to a wealth of raw data, the system may employ powerful AI techniques to enhance and augment certain data points to make them more useful in decision making. Turning free text into intents, sentiment and linguistic profiles, extracting data from pictures, turning audio files into text, taking complex multi-media objects and converting them into empirical data points that can be analyzed are just a few ways AI techniques may be leveraged.

Powerful Analytics: Having gathered and enhanced this data, the system may analyze this information to make intelligent deductions. In some examples, the system may use a combination of traditional data analysis and advanced machine learning techniques to ensure its decisions are as intelligent as possible.

Configuration: Every event that occurs within the system has an associated configuration component, which may enable a user to define the decision making approach. Configurability of these critical decisions may be important to rapidly evolving and refining a solution.

The system as described herein may observe a change in the live data streams that activates a business objective. The system may analyze relevant information and choose the best initial engagement strategy to achieve that objective. At this point, the objective may become live and proactive engagement may begin. While the objective is active, the system may be listening for new information, from the customer, from the data sensors, from other connected systems or other actors in the process. Every time new information is received, the business objective and the associated engagement strategy may be checked to ensure best fit. If not, the system may adapt its approach to ensure success. At a higher level, the system may be monitoring the success or failure of all the active engagement strategies and modifying its decisions for optimum results. If at any stage it lacks confidence in its ability to make an intelligent decision, the system may reach out to a human agent via the case management system to get the process back on track and learn a little about how to do better next time. This process of engaging and listening may continue until either the core business objective is met or is cut short for some reason, and the system may go back to checking its sensors for new objectives. Accordingly, the system may be managed through configuration and be taught how to deal with any business challenge.

In this way, a proactive, adaptive, and intelligent approach may be provided to help organizational entities provide omnichannel communications that provide a more intuitive, natural, and pleasant online experience for customers. Furthermore, a more robust and holistic approach for artificial intelligence (AI) based omnichannel communications using machine learning and predictive analysis may be imperative to overcome the shortcomings of conventional systems and methods What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A system, comprising:
   a data store to store and to manage data within a network;
   a server to facilitate operations using information from the data store;
   a machine learning (ML)-based artificial intelligence (AI) subsystem to communicate with the server and the data store in the network, the ML-based AI subsystem comprising:
   a data access interface to:
      receive data associated with a conversation with a user via a communication channel, the data for training at least one model to determine intent in the conversation with the user; and
   a processor to:
      select any unlabeled data from the data associated with the conversation from the user, the selected unlabeled data having probability of impacting the at least one model;
      provide a hierarchical multi-intent data labeling framework for labeling a representative subset of data from at least one of the data associated with the conversation with the user or the selected unlabeled data;
      train the at least one model based on the labeled representative subset of data using a plurality of parameter choices;
      retain at least one candidate model set from the at least one trained models based on global metric performance;
      generate a production-ready model based on the retained at least one candidate model set, wherein generating the production-ready model comprises:
         applying a fine-tune intent level evaluation specific to any particular client workflow by providing at least one of the following:
            providing additional training data from auxiliary models to boost specific intent performance; or
            providing data oversampling with layer level fine-tuning techniques to correct or augment specific intent performance issues; and
         creating the production-ready model based on an ensemble of successful fine-tuned candidate models from the retained at least one candidate model set; and
      deploy the production-ready model for intent determination in the conversation with the user.

2. The system of claim 1, wherein the communication channel comprises at least one of telephone, email, simple message service (SMS), mobile device application, video conference, website, digital conversational entity, and social network platform.

3. The system of claim 1, wherein the data access interface further receives data from a data source, the data source comprising at least one of a website, a document, enterprise resource planning (ERP) system, a database, a web feed, a sensor, a geolocation data source, a server, an analytics tool, a mobile device, and a reporting system.

4. The system of claim 1, wherein the conversation is a multilingual conversation based on the data received from the user or information identifying the user.

5. The system of claim 1, further wherein cloud-distributed hyper-parameter tuning and ranges for the plurality of parameter choices are predetermined.

6. The system of claim 1, wherein the plurality of parameter choices is searched and selected randomly via a cloud computing cluster to test development sets to determine which of the at least one model to retain.

7. The system of claim 1, wherein global metric performance is based on at least one global numerical metric established for each client, wherein the at least one global numerical metric comprising at least one of precision and recall metrics of given intents or importance of identifying particular intents for the given client.

8. The system of claim 1, wherein deployment of the production-ready model is cloud-agnostic.

9. A method for determining intent in a digital conversation, comprising:
  receiving, by a processor via a data access interface, data associated with a conversation with a user via a communication channel, the data for training at least one model to determine intent in the conversation with the user;
  selecting, by the processor, any unlabeled data from the data associated with the conversation from the user, the selected unlabeled data having probability of impacting the at least one model;
  providing, by the processor, a hierarchical multi-intent data labeling framework for labeling a representative subset of data from at least one of the data associated with the conversation with the user or the selected unlabeled data;
  training, by the processor, the at least one model based on the labeled representative subset of data using a plurality of parameter choices;
  retaining, by the processor, at least one candidate model set from the at least one trained models based on global metric performance;
  generating, by the processor, a production-ready model based on the retained at least one candidate model set, wherein generating the production-ready model comprises:
    applying a fine-tune intent level evaluation specific to any particular client workflow by providing at least one of the following:
      providing additional training data from auxiliary models to boost specific intent performance; or
      providing data oversampling with layer level fine-tuning techniques to correct or augment specific intent performance issues; and
    creating the production-ready model based on an ensemble of successful fine-tuned candidate models from the retained at least one candidate model set; and
  deploying, by the processor, the production-ready model for intent determination in the conversation with the user.

10. The method of claim 9, wherein the communication channel comprises at least one of telephone, email, simple message service (SMS), mobile device application, video conference, website, digital conversational entity, and social network platform.

11. The method of claim 9, wherein the data access interface further receives data from a data source, the data source comprising at least one of a website, a document, enterprise resource planning (ERP) system, a database, a web feed, a sensor, a geolocation data source, a server, an analytics tool, a mobile device, and a reporting system.

12. The method of claim 9, wherein the conversation is a multilingual conversation based on the data received from the user or information identifying the user.

13. The method of claim 9, further wherein cloud-distributed hyper-parameter tuning and ranges for the plurality of parameter choices are predetermined.

14. The method of claim 9, wherein the plurality of parameter choices is searched and selected randomly via a cloud computing cluster to test development sets to determine which of the at least one model to retain.

15. The method of claim 9, wherein global metric performance is based on at least one global numerical metric established for each client, wherein the at least one global numerical metric comprising at least one of precision and recall metrics of given intents or importance of identifying particular intents for the given client.

16. The method of claim 9, wherein deployment of the production-ready model is cloud-agnostic.

17. A non-transitory computer-readable storage medium having an executable stored thereon, which when executed instructs a processor to perform the following:
  receiving data associated with a conversation with a user via a communication channel, the data for training at least one model to determine intent in the conversation with the user;
  selecting any unlabeled data from the data associated with the conversation from the user, the selected unlabeled data having probability of impacting the at least one model;
  providing a hierarchical multi-intent data labeling framework for labeling a representative subset of data from at least one of the data associated with the conversation with the user or the selected unlabeled data;
  training the at least one model based on the labeled representative subset of data using a plurality of parameter choices;
  retaining at least one candidate model set from the at least one trained models based on global metric performance;
  generating a production-ready model based on the retained at least one candidate model set, wherein generating the production-ready model comprises:
    applying a fine-tune intent level evaluation specific to any particular client workflow by providing at least one of the following:
      providing additional training data from auxiliary models to boost specific intent performance; or
      providing data oversampling with layer level fine-tuning techniques to correct or augment specific intent performance issues; and
    creating the production-ready model based on an ensemble of successful fine-tuned candidate models from the retained at least one candidate model set; and
  deploying the production-ready model for intent determination in the conversation with the user.

* * * * *